(12) United States Patent
Iyer et al.

(10) Patent No.: US 10,146,733 B2
(45) Date of Patent: Dec. 4, 2018

(54) HIGH PERFORMANCE INTERCONNECT PHYSICAL LAYER

(71) Applicant: Intel Corporation, Santa Clara, CA (US)

(72) Inventors: Venkatraman Iyer, Ausin, TX (US); Darren S. Jue, Sunnyvale, CA (US); Robert G. Blankenship, Tacoma, WA (US); Fulvio Spagna, San Jose, CA (US); Debendra Das Sharma, Saratoga, CA (US); Jeffrey C. Swanson, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 116 days.

(21) Appl. No.: 15/167,461

(22) Filed: May 27, 2016

(65) Prior Publication Data

US 2016/0378711 A1 Dec. 29, 2016

Related U.S. Application Data

(63) Continuation of application No. 13/976,937, filed as application No. PCT/US2013/034188 on Mar. 27, 2013, now Pat. No. 9,355,058.

(Continued)

(51) Int. Cl.
*G06F 13/42* (2006.01)
*G06N 99/00* (2010.01)
(Continued)

(52) U.S. Cl.
CPC ............ *G06F 13/4291* (2013.01); *G06F 1/24* (2013.01); *G06F 1/3287* (2013.01);
(Continued)

(58) Field of Classification Search
CPC . G06F 12/0831; G06F 13/385; G06F 13/4265
See application file for complete search history.

(56) References Cited

U.S. PATENT DOCUMENTS

| | | | |
|---|---|---|---|
| 5,383,143 | A | 1/1995 | Crouch et al. |
| 7,089,485 | B2 | 8/2006 | Azadet et al. |

(Continued)

FOREIGN PATENT DOCUMENTS

| | | |
|---|---|---|
| CN | 101179326 B | 5/2008 |
| CN | 102238623 A | 11/2011 |

(Continued)

OTHER PUBLICATIONS

Chinese Patent Office First Office Action and Search Report in Chinese Patent Application No. 201380049075.2 dated Apr. 1, 2017.

(Continued)

*Primary Examiner* — Brian T Misiura
(74) *Attorney, Agent, or Firm* — Alliance IP, LLC

(57) ABSTRACT

A periodic control window is embedded in a link layer data stream to be sent over a serial data link, where the control window is configured to provide physical layer information including information for use in initiating state transitions on the data link. The link layer data can be sent during a link transmitting state of the data link and the control window can interrupt the sending of flits. In one aspect, the information includes link width transition data indicating an attempt to change the number of active lanes on the link.

22 Claims, 15 Drawing Sheets

Related U.S. Application Data

(60) Provisional application No. 61/717,091, filed on Oct. 22, 2012.

(51) Int. Cl.
  *G06F 1/24* (2006.01)
  *G06F 1/32* (2006.01)
  *G06F 13/16* (2006.01)

(52) U.S. Cl.
  CPC .......... *G06F 13/1678* (2013.01); *G06F 13/42* (2013.01); *G06F 13/4282* (2013.01); *G06N 99/005* (2013.01)

(56) References Cited

U.S. PATENT DOCUMENTS

| | | |
|---|---|---|
| 7,334,047 B1 | 2/2008 | Pillay-Esnault |
| 7,801,121 B1 | 9/2010 | Wageningen et al. |
| 7,802,049 B2 | 9/2010 | Levy |
| 8,026,726 B2 | 9/2011 | Sul et al. |
| 8,180,007 B2 | 5/2012 | Iqbal et al. |
| 8,527,677 B1 | 9/2013 | Richard et al. |
| 8,751,714 B2 | 6/2014 | Safranek et al. |
| 8,904,079 B2 | 12/2014 | Chang et al. |
| 9,229,897 B2 * | 1/2016 | Iyer ..................... G06F 13/4291 |
| 9,355,058 B2 | 5/2016 | Iyer et al. |
| 2005/0226201 A1 | 10/2005 | McMillin |
| 2006/0034295 A1 | 2/2006 | Cherukuri et al. |
| 2006/0041696 A1 | 2/2006 | Cherukuri et al. |
| 2006/0041715 A1 | 2/2006 | Chrysos et al. |
| 2009/0198913 A1 | 8/2009 | Batson et al. |
| 2009/0252326 A1 | 10/2009 | Buchmann et al. |
| 2010/0005245 A1 | 1/2010 | Beers et al. |
| 2010/0027473 A1 | 2/2010 | Ghosh |
| 2011/0138096 A1 | 6/2011 | Radulescu et al. |
| 2012/0011276 A1 | 1/2012 | Cherukuri et al. |
| 2012/0079156 A1 | 3/2012 | Safranek et al. |
| 2012/0079160 A1 | 3/2012 | Iyer et al. |
| 2013/0007491 A1 * | 1/2013 | Iyer ....................... G06F 1/3206 713/321 |
| 2014/0095751 A1 * | 4/2014 | Iyer ......................... G06F 13/38 710/107 |
| 2014/0112339 A1 | 4/2014 | Safranek et al. |
| 2014/0115207 A1 | 4/2014 | Iyer et al. |
| 2014/0115374 A1 | 4/2014 | Iyer et al. |
| 2014/0153656 A1 | 6/2014 | Hsu et al. |
| 2015/0067208 A1 | 3/2015 | Iyer et al. |

FOREIGN PATENT DOCUMENTS

| | | |
|---|---|---|
| EP | 0991222 B1 | 4/2003 |
| EP | 1400066 B1 | 10/2008 |
| WO | 2011067136 A1 | 6/2011 |

OTHER PUBLICATIONS

Korean Patent Office Notice of Preliminary Rejection in Korean Application No. 2017-7000322 dated Mar. 22, 2017.
German Office Action in German Patent Application No. 112013005104.4 dated Jul. 7, 2017, 4 pages.
Non Final Office Action in U.S. Appl. No. 13/976,937 dated Sep. 28, 2015, 5 pages.
Notice of Allowance Office Action in U.S. Appl. No. 13/976,937 dated Feb. 1, 2016, 5 pages.
Korean Notice of Preliminary Injection in Korean Application No. 2015-7007226 dated Mar. 14, 2016.
Non-Final Office Action in U.S. Appl. No. 13/976,937 dated Sep. 28, 2015.
Notice of Allowance in U.S. Appl. No. 14/538,937 dated Aug. 3, 2015.
PCT International Preliminary Report on Patentability in PCT International Application Serial No. PCT/US2013/034188 dated Apr. 28, 2015.
PCT International Search Report and Written Opinion received for PCT Patent Application No. PCT/US2013/034188, dated Jul. 18, 2013.
Korean Notice of Allowance in Korean Application No. 2017-7000322 dated Sep. 28, 2017, 4 pgs (including translation).

* cited by examiner

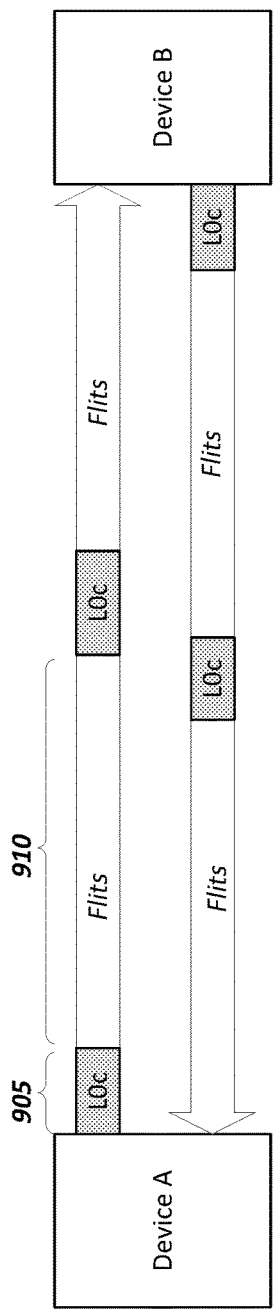
FIG. 9
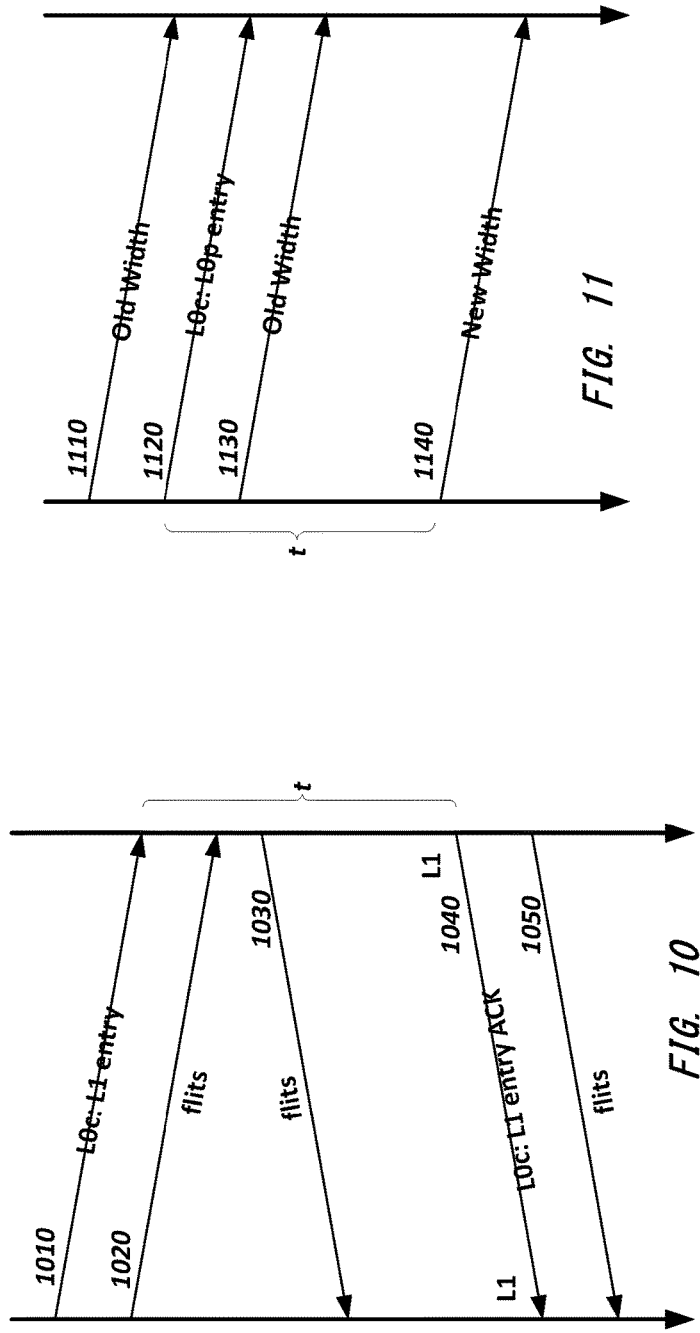
FIG. 11
FIG. 10

HIGH PERFORMANCE INTERCONNECT PHYSICAL LAYER

CROSS-REFERENCE TO RELATED APPLICATIONS

This application is a continuation U.S. application Ser. No. 13/976,937, filed on Jun. 27, 2013, now U.S. Pat. No. 9,355,058, and entitled HIGH PERFORMANCE INTERCONNECT LAYER which is a national stage application under 35 U.S.C. § 371 of PCT International Application Serial No. PCT/US2013/034188, filed on Mar. 27, 2013 and entitled HIGH PERFORMANCE INTERCONNECT PHYSICAL LAYER, which application claims the benefit of priority to U.S. Provisional Patent Application Ser. No. 61/717,091 filed on Oct. 22, 2012 and entitled METHOD, APPARATUS, SYSTEM FOR A HIGH PERFORMANCE INTERCONNECT ARCHITECTURE. The disclosures of the prior applications are considered part of and are hereby incorporated by reference in their entirety in the disclosure of this application.

FIELD

The present disclosure relates in general to the field of computer development, and more specifically, to software development involving coordination of mutually-dependent constrained systems.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIG. 9 illustrates a representation of an example control window embedded in a data stream.

FIG. 10 illustrates a flow diagram of an example handshake.

FIG. 11 illustrates a flow diagram of an example transition to a partial width state.

Like reference numbers and designations in the various drawings indicate like elements.

DETAILED DESCRIPTION

Figure 1:
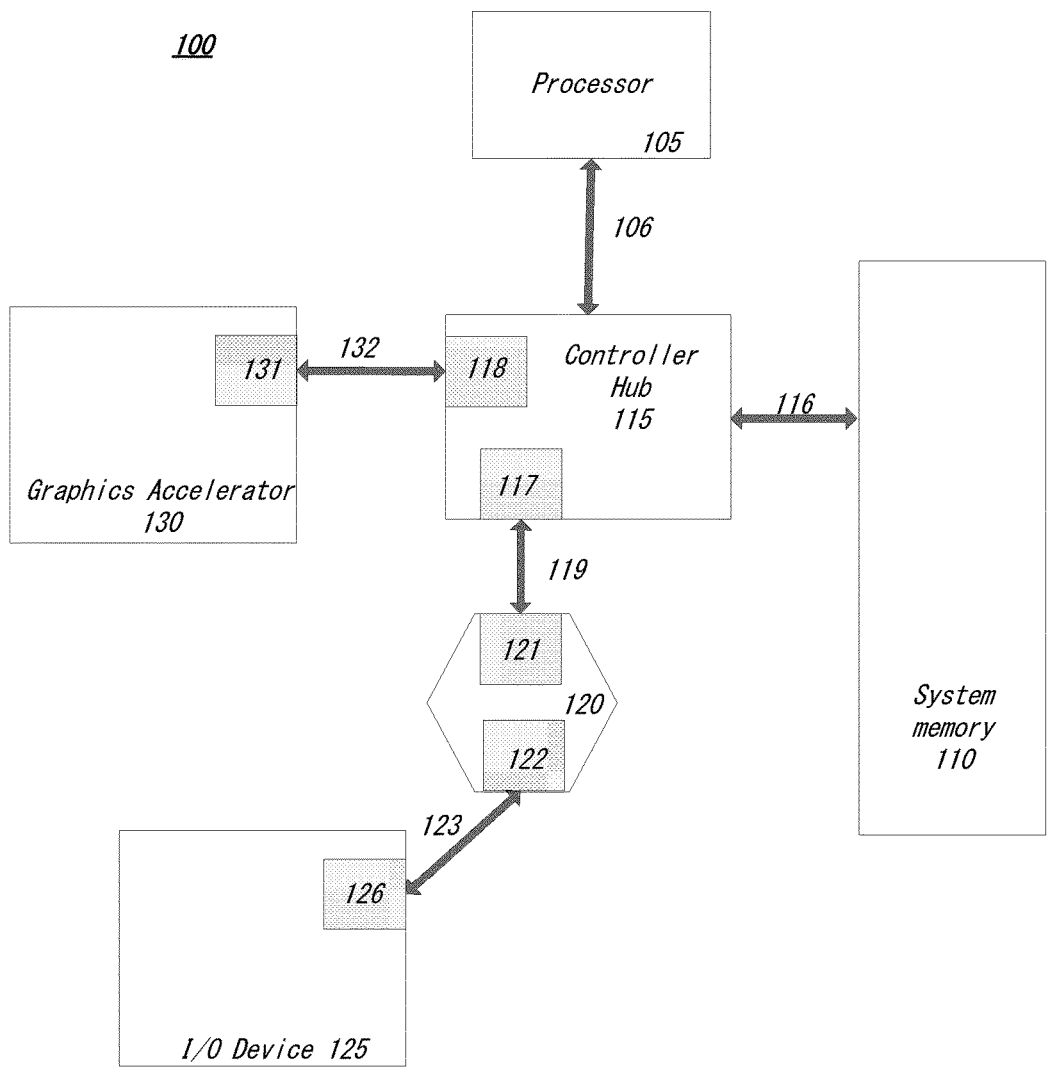
FIG. 1 illustrates a simplified block diagram of a system including a serial point-to-point interconnect to connect I/O devices in a computer system in accordance with one embodiment.

In the following description, numerous specific details are set forth, such as examples of specific types of processors and system configurations, specific hardware structures, specific architectural and micro architectural details, specific register configurations, specific instruction types, specific system components, specific processor pipeline stages, specific interconnect layers, specific packet/transaction configurations, specific transaction names, specific protocol exchanges, specific link widths, specific implementations, and operation etc. in order to provide a thorough understanding of the present invention. It may be apparent, however, to one skilled in the art that these specific details need not necessarily be employed to practice the subject matter of the present disclosure. In other instances, well detailed description of known components or methods has been avoided, such as specific and alternative processor architectures, specific logic circuits/code for described algorithms, specific firmware code, low-level interconnect operation, specific logic configurations, specific manufacturing techniques and materials, specific compiler implementations, specific expression of algorithms in code, specific power down and gating techniques/logic and other specific operational details of computer system in order to avoid unnecessarily obscuring the present disclosure.

Although the following embodiments may be described with reference to energy conservation, energy efficiency, processing efficiency, and so on in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from such features. For example, the disclosed embodiments are not limited to server computer system, desktop computer systems, laptops, Ultrabooks™, but may be also used in other devices, such as handheld devices, smartphones, tablets, other thin notebooks, systems on a chip (SOC) devices, and embedded applications. Some examples of handheld devices include cellular phones, Internet protocol devices, digital cameras, personal digital assistants (PDAs), and handheld PCs. Here, similar techniques for a high-performance interconnect may be applied to increase performance (or even save power) in a low power interconnect. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As may become readily apparent in the description below, the embodiments of methods, apparatus', and systems described herein (whether in reference to hardware, firmware, software, or a combination thereof) may be considered vital to a "green technology" future balanced with performance considerations.

As computing systems are advancing, the components therein are becoming more complex. The interconnect architecture to couple and communicate between the components has also increased in complexity to ensure bandwidth demand is met for optimal component operation. Furthermore, different market segments demand different aspects of interconnect architectures to suit the respective market. For example, servers require higher performance, while the mobile ecosystem is sometimes able to sacrifice overall performance for power savings. Yet, it is a singular purpose of most fabrics to provide highest possible performance with maximum power saving. Further, a variety of different interconnects can potentially benefit from subject matter described herein.

The Peripheral Component Interconnect (PCI) Express (PCIe) interconnect fabric architecture and QuickPath Interconnect (QPI) fabric architecture, among other examples, can potentially be improved according to one or more principles described herein, among other examples. For instance, a primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express. Although the primary discussion herein is in reference to a new high-performance interconnect (HPI) architecture, aspects of the invention described herein may be applied to other interconnect architectures, such as a PCIe-compliant architecture, a QPI-compliant architecture, a MIPI compliant architecture, a high-performance architecture, or other known interconnect architecture.

Referring to FIG. 1, an embodiment of a fabric composed of point-to-point Links that interconnect a set of components is illustrated. System 100 includes processor 105 and system memory 110 coupled to controller hub 115. Processor 105 can include any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 can include a root hub, root complex, or root controller, such as in a PCIe interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, can include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a bridge (e.g., a PCIe to PCI/PCI-X bridge) to support legacy or other versions of devices or interconnect fabrics supported by such devices.

Graphics accelerator 130 can also be coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
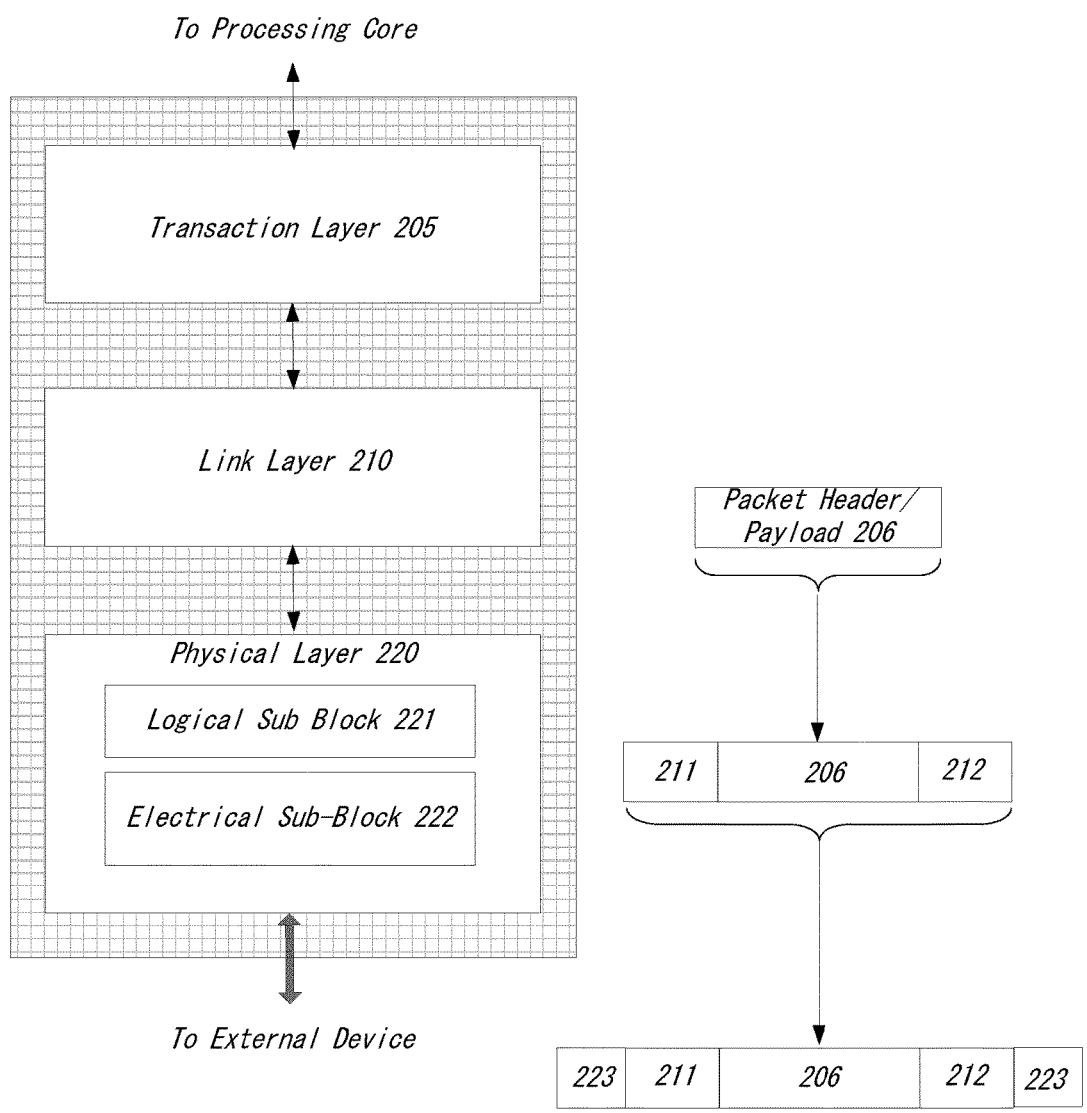
FIG. 2 illustrates a simplified block diagram of a layered protocol stack in accordance with one embodiment.

Turning to FIG. 2 an embodiment of a layered protocol stack is illustrated. Layered protocol stack 200 can includes any form of a layered communication stack, such as a QPI stack, a PCIe stack, a next generation high performance computing interconnect (HPI) stack, or other layered stack. In one embodiment, protocol stack 200 can include transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

Packets can be used to communicate information between components. Packets can be formed in the Transaction Layer 205 and Data Link Layer 210 to carry the information from the transmitting component to the receiving component. As the transmitted packets flow through the other layers, they are extended with additional information used to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

In one embodiment, transaction layer 205 can provide an interface between a device's processing core and the interconnect architecture, such as Data Link Layer 210 and Physical Layer 220. In this regard, a primary responsibility of the transaction layer 205 can include the assembly and disassembly of packets (i.e., transaction layer packets, or TLPs). The translation layer 205 can also manage credit-based flow control for TLPs. In some implementations, split transactions can be utilized, i.e., transactions with request and response separated by time, allowing a link to carry other traffic while the target device gathers data for the response, among other examples.

Credit-based flow control can be used to realize virtual channels and networks utilizing the interconnect fabric. In one example, a device can advertise an initial amount of credits for each of the receive buffers in Transaction Layer 205. An external device at the opposite end of the link, such as controller hub 115 in FIG. 1, can count the number of credits consumed by each TLP. A transaction may be transmitted if the transaction does not exceed a credit limit. Upon receiving a response an amount of credit is restored. One example of an advantage of such a credit scheme is that the latency of credit return does not affect performance, provided that the credit limit is not encountered, among other potential advantages.

In one embodiment, four transaction address spaces can include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions can be used to access configuration space of various devices connected to the interconnect. Transactions to the configuration space can include read requests and write requests. Message space transactions (or, simply messages) can also be defined to support in-band communication between interconnect agents. Therefore, in one example embodiment, transaction layer 205 can assemble packet header/payload 206.

Figures 3, 4:
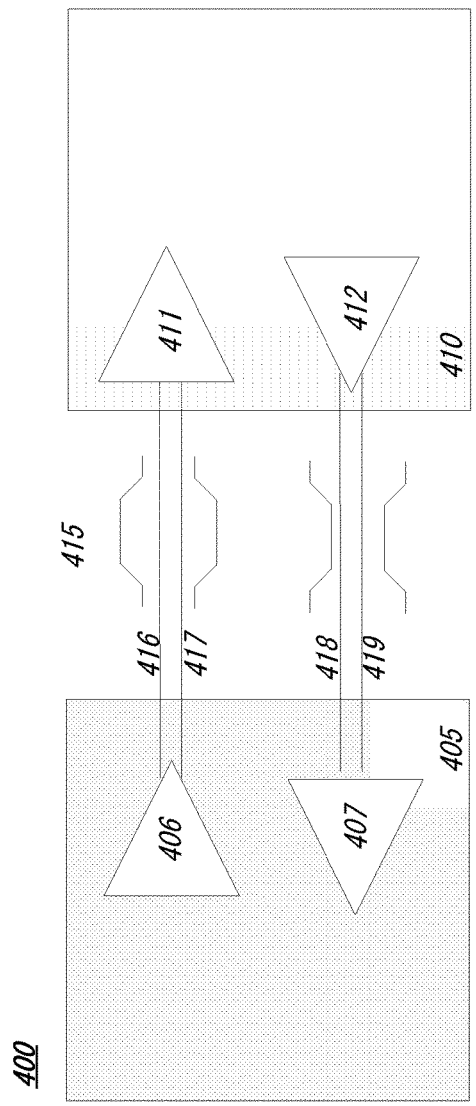
FIG. 3 illustrates an embodiment of a transaction descriptor.
FIG. 4 illustrates an embodiment of a serial point-to-point link.

Quickly referring to FIG. 3, an example embodiment of a transaction layer packet descriptor is illustrated. In one embodiment, transaction descriptor 300 can be a mechanism for carrying transaction information. In this regard, transaction descriptor 300 supports identification of transactions in a system. Other potential uses include tracking modifications of default transaction ordering and association of transaction with channels. For instance, transaction descriptor 300 can include global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and can be unique for all outstanding requests that require a completion for that requesting agent. Furthermore, in this example, source identifier 310 uniquely identifies the requestor agent within an interconnect hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Returning to the discussion of FIG. 2, a Link layer 210, also referred to as data link layer 210, can act as an intermediate stage between transaction layer 205 and the physical layer 220. In one embodiment, a responsibility of the data link layer 210 is providing a reliable mechanism for exchanging Transaction Layer Packets (TLPs) between two components on a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

In one example, physical layer 220 includes logical sub block 221 and electrical sub-block 222 to physically transmit a packet to an external device. Here, logical sub-block 221 is responsible for the "digital" functions of Physical Layer 221. In this regard, the logical sub-block can include a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one example embodiment, an 8$b$/10$b$ transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a protocol stack (such as a PCIe protocol stack), a layered protocol stack is not so limited. In fact, any layered protocol may be included/implemented and adopt features discussed herein. As an example, a port/interface that is represented as a layered protocol can include: (1) a first layer to assemble packets, i.e. a transaction layer; a second layer to sequence packets, i.e. a link layer; and a third layer to transmit the packets, i.e. a physical layer. As a specific example, a high performance interconnect layered protocol, as described herein, is utilized.

Referring next to FIG. 4, an example embodiment of a serial point to point fabric is illustrated. A serial point-to-point link can include any transmission path for transmitting serial data. In the embodiment shown, a link can include two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in some implementations of a link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported link width, such as 1, 2, 4, 8, 12, 16, 32, 64, or wider.

A differential pair can refer to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, among other example advantages. This allows for a better timing window, which enables faster transmission frequencies.

In one embodiment, a new High Performance Interconnect (HPI) is provided. HPI can include a next-generation cache-coherent, link-based interconnect. As one example, HPI may be utilized in high performance computing platforms, such as workstations or servers, including in systems where PCIe or another interconnect protocol is typically used to connect processors, accelerators, I/O devices, and the like. However, HPI is not so limited. Instead, HPI may be utilized in any of the systems or platforms described herein. Furthermore, the individual ideas developed may be applied to other interconnects and platforms, such as PCIe, MIPI, QPI, etc.

Figure 5:
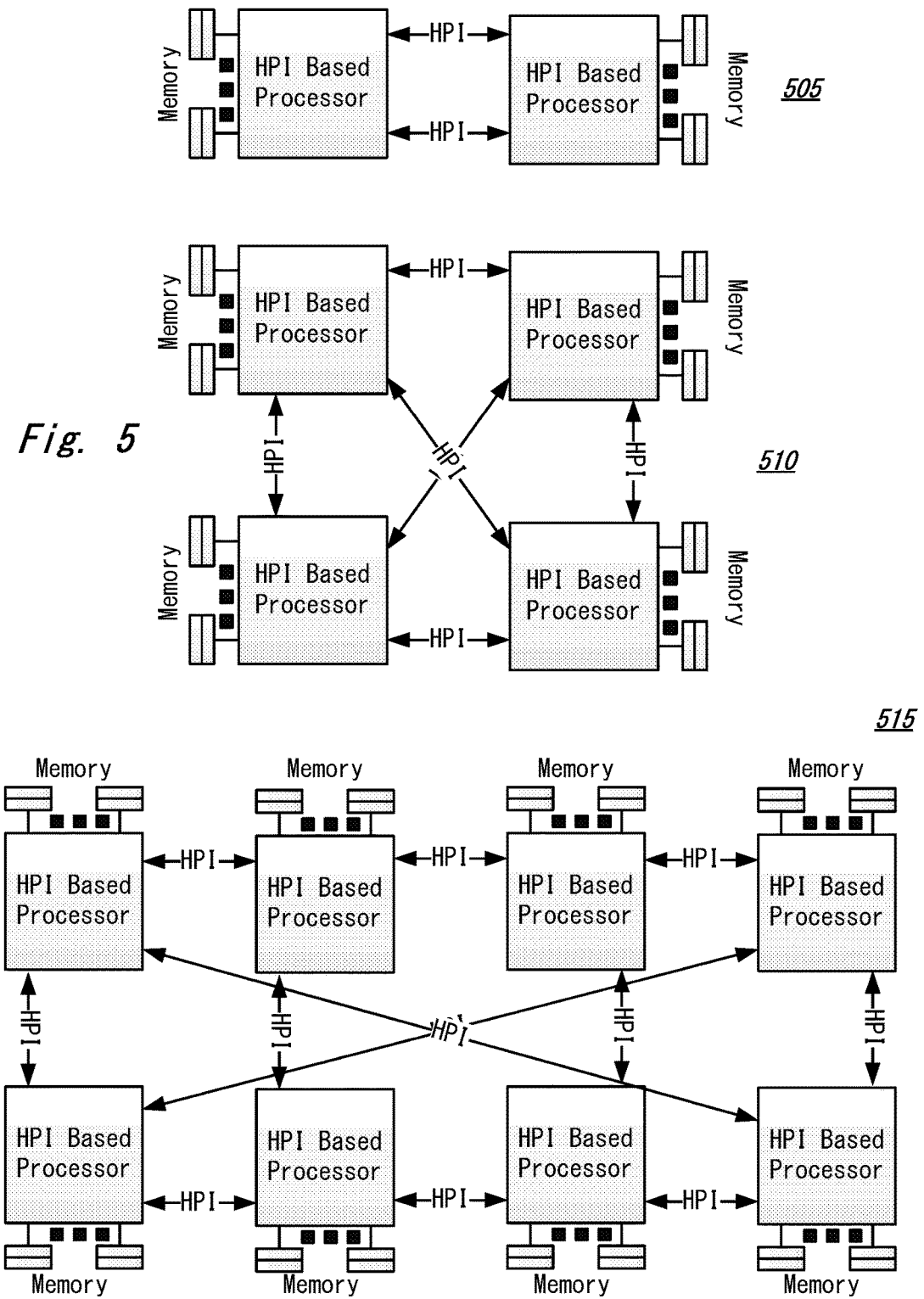
FIG. 5 illustrates embodiments of potential High Performance Interconnect (HPI) system configurations.

To support multiple devices, in one example implementation, HPI can include an Instruction Set Architecture (ISA) agnostic (i.e. HPI is able to be implemented in multiple different devices). In another scenario, HPI may also be utilized to connect high performance I/O devices, not just processors or accelerators. For example, a high performance PCIe device may be coupled to HPI through an appropriate translation bridge (i.e. HPI to PCIe). Moreover, the HPI links may be utilized by many HPI based devices, such as processors, in various ways (e.g. stars, rings, meshes, etc.). FIG. 5 illustrates example implementations of multiple potential multi-socket configurations. A two-socket configuration 505, as depicted, can include two HPI links; however, in other implementations, one HPI link may be utilized. For larger topologies, any configuration may be utilized as long as an identifier (ID) is assignable and there is some form of virtual path, among other additional or substitute features. As shown, in one example, a four socket configuration 510 has an HPI link from each processor to another. But in the eight socket implementation shown in configuration 515, not every socket is directly connected to each other through an HPI link. However, if a virtual path or channel exists between the processors, the configuration is supported. A range of supported processors includes 2-32 in a native domain. Higher numbers of processors may be reached through use of multiple domains or other interconnects between node controllers, among other examples.

The HPI architecture includes a definition of a layered protocol architecture, including in some examples, protocol layers (coherent, non-coherent, and, optionally, other memory based protocols), a routing layer, a link layer, and a physical layer. Furthermore, HPI can further include enhancements related to power managers (such as power control units (PCUs)), design for test and debug (DFT), fault handling, registers, security, among other examples. FIG. 5 illustrates an embodiment of an example HPI layered protocol stack. In some implementations, at least some of the layers illustrated in FIG. 5 may be optional. Each layer deals with its own level of granularity or quantum of information (the protocol layer 605$a,b$ with packets 630, link layer 610$a,b$ with flits 635, and physical layer 605$a,b$ with phits 640). Note that a packet, in some embodiments, may include partial flits, a single flit, or multiple flits based on the implementation.

As a first example, a width of a phit 640 includes a 1 to 1 mapping of link width to bits (e.g. 20 bit link width includes a phit of 20 bits, etc.). Flits may have a greater size, such as 184, 192, or 200 bits. Note that if phit 640 is 20 bits wide and the size of flit 635 is 184 bits then it takes a fractional number of phits 640 to transmit one flit 635 (e.g. 9.2 phits at 20 bits to transmit an 184 bit flit 635 or 9.6 at 20 bits to transmit a 192 bit flit, among other examples). Note that widths of the fundamental link at the physical layer may vary. For example, the number of lanes per direction may include 2, 4, 6, 8, 10, 12, 14, 16, 18, 20, 22, 24, etc. In one embodiment, link layer 610a,b is capable of embedding multiple pieces of different transactions in a single flit, and one or multiple headers (e.g. 1, 2, 3, 4) may be embedded within the flit. In one example, HPI splits the headers into corresponding slots to enable multiple messages in the flit destined for different nodes.

Physical layer 605a,b, in one embodiment, can be responsible for the fast transfer of information on the physical medium (electrical or optical etc.). The physical link can be point-to-point between two Link layer entities, such as layer 605a and 605b. The Link layer 610a,b can abstract the Physical layer 605a,b from the upper layers and provides the capability to reliably transfer data (as well as requests) and manage flow control between two directly connected entities. The Link Layer can also be responsible for virtualizing the physical channel into multiple virtual channels and message classes. The Protocol layer 620a,b relies on the Link layer 610a,b to map protocol messages into the appropriate message classes and virtual channels before handing them to the Physical layer 605a,b for transfer across the physical links. Link layer 610a,b may support multiple messages, such as a request, snoop, response, writeback, non-coherent data, among other examples.

Figure 6:
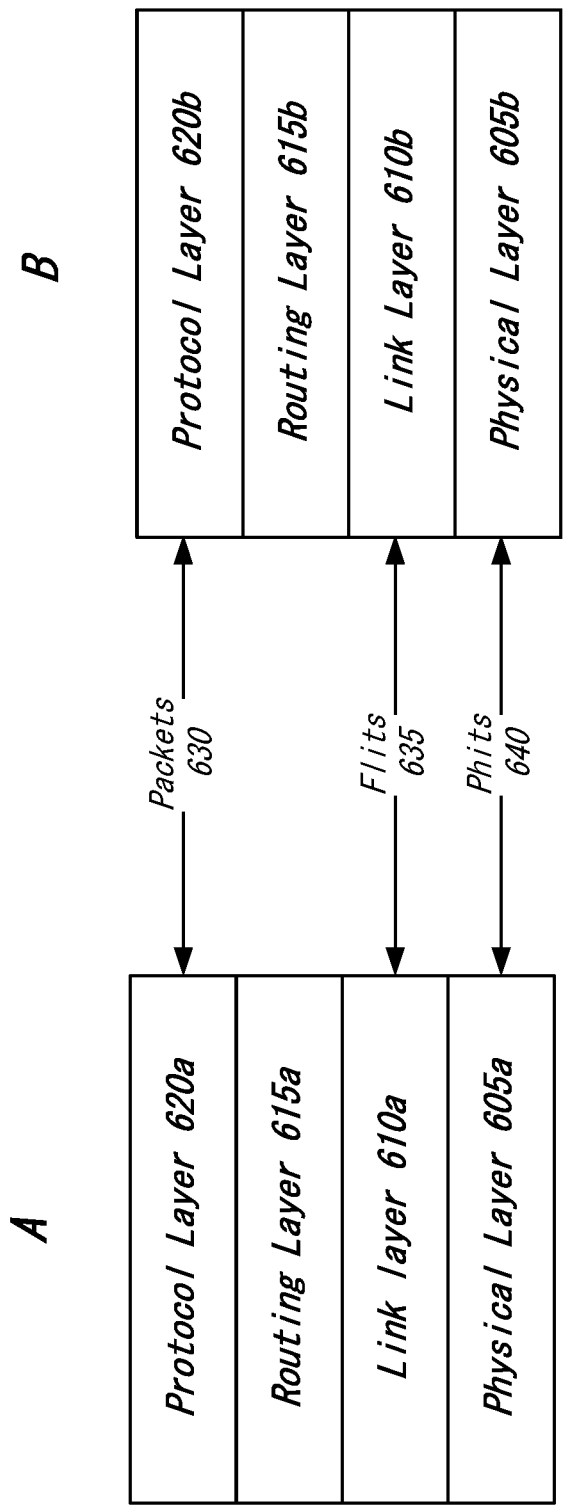
FIG. 6 illustrates an embodiment of a layered protocol stack associated with HPI.

The Physical layer 605a,b (or PHY) of HPI can be implemented above the electrical layer (i.e. electrical conductors connecting two components) and below the link layer 610a,b, as illustrated in FIG. 6. The Physical layer and corresponding logic can reside on each agent and connects the link layers on two agents (A and B) separated from each other (e.g. on devices on either side of a link). The local and remote electrical layers are connected by physical media (e.g. wires, conductors, optical, etc.). The Physical layer 605a,b, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the Physical layer transports flits from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, Link layer 610a,b can be implemented so as to provide reliable data transfer between two protocol or routing entities. The Link layer can abstract Physical layer 605a,b from the Protocol layer 620a,b, and can be responsible for the flow control between two protocol agents (A, B), and provide virtual channel services to the Protocol layer (Message Classes) and Routing layer (Virtual Networks). The interface between the Protocol layer 620a,b and the Link Layer 610a,b can typically be at the packet level. In one embodiment, the smallest transfer unit at the Link Layer is referred to as a flit which a specified number of bits, such as 192 bits or some other denomination. The Link Layer 610a,b relies on the Physical layer 605a,b to frame the Physical layer's 605a,b unit of transfer (phit) into the Link Layer's 610a,b unit of transfer (flit). In addition, the Link Layer 610a,b may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, Routing layer 615a,b can provide a flexible and distributed method to route HPI transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a HPI packet into the HPI fabric. The lookup at an intermediate router may be used to route an HPI packet from an input port to an output port. The lookup at a destination port may be used to target the destination HPI protocol agent. Note that the Routing layer, in some implementations, can be thin since the routing tables, and, hence the routing algorithms, are not specifically defined by specification. This allows for flexibility and a variety of usage models, including flexible platform architectural topologies to be defined by the system implementation. The Routing layer 615a,b relies on the Link layer 610a,b for providing the use of up to three (or more) virtual networks (VNs)—in one example, two deadlock-free VNs, VN0 and VN1 with several message classes defined in each virtual network. A shared adaptive virtual network (VNA) may be defined in the Link layer, but this adaptive network may not be exposed directly in routing concepts, since each message class and virtual network may have dedicated resources and guaranteed forward progress, among other features and examples.

In some implementations, HPI can utilize an embedded clock. A clock signal can be embedded in data transmitted using the interconnect. With the clock signal embedded in the data, distinct and dedicated clock lanes can be omitted. This can be useful, for instance, as it can allow more pins of a device to be dedicated to data transfer, particularly in systems where space for pins is at a premium.

A link can be established between two agents on either side of an interconnect. An agent sending data can be a local agent and the agent receiving the data can be a remote agent. State machines can be employed by both agents to manage various aspects of the link. In one embodiment, the Physical layer datapath can transmit flits from the link layer to the electrical front-end. The control path, in one implementation, includes a state machine (also referred to as a link training state machine or the similar). The state machine's actions and exits from states may depend on internal signals, timers, external signals or other information. In fact, some of the states, such as a few initialization states, may have timers to provide a timeout value to exit a state. Note that detect, in some embodiments, refers to detecting an event on both legs of a lane; but not necessarily simultaneously. However, in other embodiments, detect refers to detection of an event by an agent of reference. Debounce, as one example, refers to sustained assertion of a signal. In one embodiment, HPI supports operation in the event of non-function lanes. Here, lanes may be dropped at specific states.

States defined in the state machine can include reset states, initialization states, and operational states, among other categories and subcategories. In one example, some initialization states can have a secondary timer which is used to exit the state on a timeout (essentially an abort due to failure to make progress in the state). An abort may include updating of registers, such as status register. Some states can also have primary timer(s) which are used to time the primary functions in the state. Other states can be defined such that internal or external signals (such as handshake protocols) drive transition from the state to another state, among other examples.

A state machine may also support debug through single step, freeze on initialization abort and use of testers. Here, state exits can be postponed/held until the debug software is ready. In some instance, the exit can be postponed/held until the secondary timeout. Actions and exits, in one embodiment, can be based on exchange of training sequences. In one embodiment, the link state machine is to run in the local agent clock domain and transition from one state to the next is to coincide with a transmitter training sequence boundary. Status registers may be utilized to reflect the current state.

Figure 7:
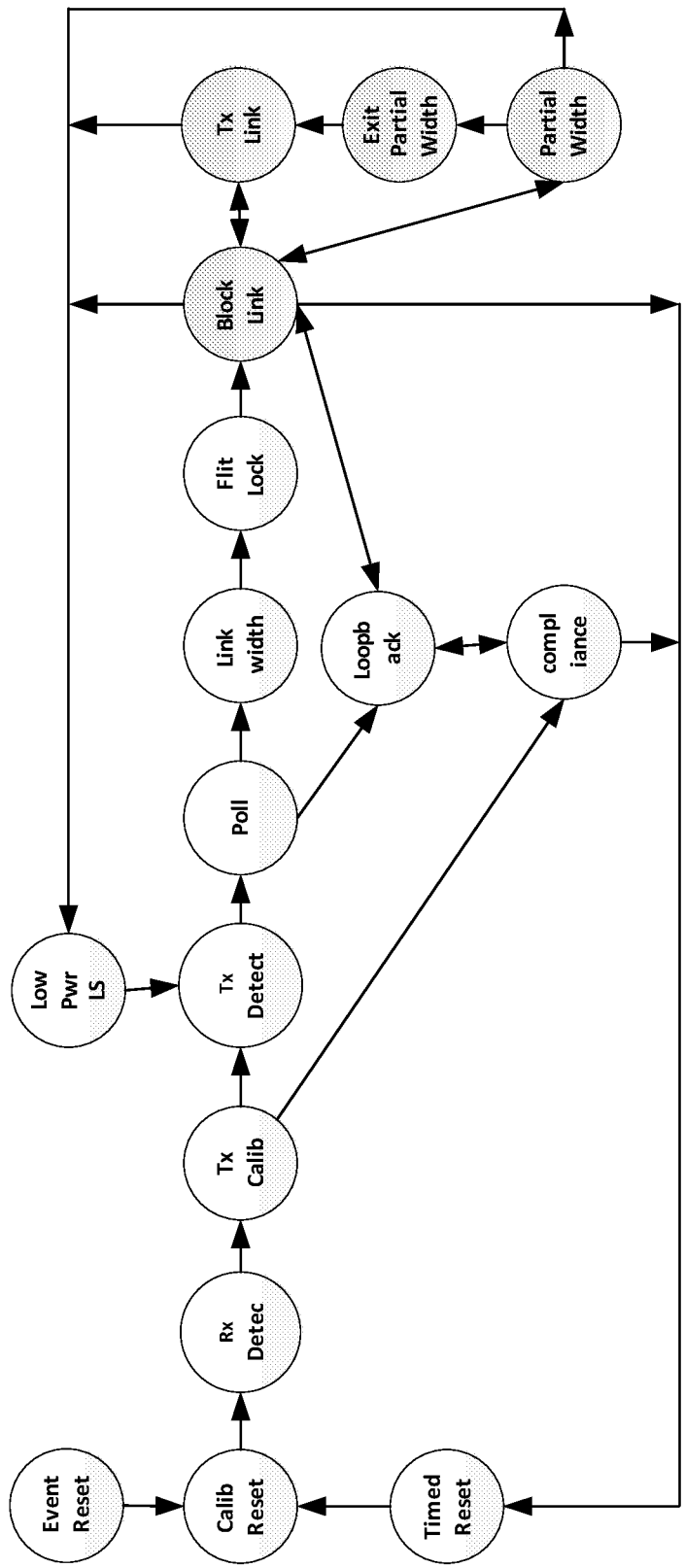
FIG. 7 illustrates a representation of an example state machine.

FIG. 7 illustrates a representation of at least a portion of a state machine used by agents in one example implementation of HPI. It should be appreciated that the states included in the state table of FIG. 7 include a non-exhaustive listing of possible states. For instance, some transitions are omitted to simplify the diagram. Also, some states may be combined, split, or omitted, while others might be added. Such states can include:

Event reset state: entered on a warm or cold reset event. Restores default values. Initialize counters (e.g., sync counters). May exit to another state, such as another reset state.

Timed reset state: timed state for in-band reset. May drive a predefined electrical ordered set (EOS) so remote receivers are capable of detecting the EOS and entering the timed reset as well. Receiver has lanes holding electrical settings. May exit to an agent to calibrate reset state.

Calibrate reset state: calibration without signaling on the lane (e.g. receiver calibration state) or turning drivers off. May be a predetermined amount of time in the state based on a timer. May set an operational speed. May act as a wait state when a port is not enabled. May include minimum residency time. Receiver conditioning or staggering off may occur based on design. May exit to a receiver detect state after a timeout and/or completion of calibration.

Receiver detect state: detect presence of a receiver on lane(s). May look for receiver termination (e.g. receiver pulldown insertion). May exit to calibrate reset state upon a specified value being set or when another specified value is not set. May exit to transmitter calibrate state if a receiver is detected or a timeout is reached.

Transmitter calibrate state: for transmitter calibrations. May be a timed state allocated for transmitter calibrations. May include signaling on a lane. May continuously drive an EOS, such as an EIEOS. May exit to compliance state when done calibrating or on expiration of a timer. May exit to transmitter detect state if a counter has expired or a secondary timeout has occurred.

Transmitter detect state: qualifies valid signaling. May be a handshake state where an agent completes actions and exits to a next state based on remote agent signaling. Receiver may qualify valid signaling from transmitter. Receiver, in one embodiment, looks for a wake detect, and if debounced on one or more lanes looks for it on the other lanes. Transmitter drives a detect signal. May exit to a polling state in response to debounce being completed for all lanes and/or a timeout or if debounce on all lanes is not complete and there is a timeout. Here, one or more monitor lanes may be kept awake to debounce a wake signal. And if debounced then the other lanes are potentially debounced. This can enable power savings in low power states.

Polling state: receiver adapts, initializes drift buffer and locks on bits/bytes (e.g. identifies symbol boundaries). Lanes may be deskewed. A remote agent may cause an exit to a next state (e.g. a Link Width State) in response to an acknowledge message. Polling can additionally include a training sequence lock by locking to an EOS and a training sequence header. Lane to lane skew at remote transmitter may be capped at a first length for top speed and a second length for slow speed. Deskew may be performed in a slow mode as well as an operational mode. Receiver may have a specific maximum to deskew lane-to-lane skew, such as 8, 16, or 32 intervals of skew. Receiver actions may include latency fixing. Receiver actions, in one embodiment, can be completed on successful deskew of a valid lane map. A successful handshake can be achieved, in one example, when a number of consecutive training sequence headers are received with acknowledgements and a number of training sequences with an acknowledge are transmitted after the receiver has completed its actions.

Link width state: agent communicates with the final lane map to remote transmitter. Receiver receives the information and decodes. Receiver may record a configured lane map in a structure after checkpoint of a previous lane map value in a second structure. Receiver may also respond with an acknowledge ("ACK"). May initiate an in-band reset. As one example, first state to initiate in-band reset. In one embodiment, exit to a next state, such as flit configuration state, is performed in response to the ACK. Further, prior to entering low power state, a reset signal may also be generated if the frequency of a wake detect signal occurrence drops below a specified value (e.g. 1 every number of unit intervals (UIs), such as 4K UI). Receiver may hold current and previous lane maps. Transmitter may use different groups of lanes based on training sequences having different values. Lane map may not modify some status registers in some embodiments.

Flitlock configuration state: entered by a transmitter but the state is considered exited (i.e. secondary timeout moot) when both transmitter and receiver have exited to a blocking link state or other link state. Transmitter exit to a link state, in one embodiment, includes start of a data sequence (SDS) and training sequence (TS) boundary after receiving a planetary alignment signal. Here, receiver exit may be based on receiving an SDS from a remote transmitter. This state may be a bridge from agent to link state. Receiver identifies SDS. Receiver may exit to blocking link state (BLS) (or a control window) if SDS received after a descrambler is initialized. If a timeout occurs, exit may be to reset state. Transmitter drives lanes with a configuration signal. Transmitter exit may be to reset, BLS, or other states based on conditions or timeouts.

Transmitting Link State: a link state. Flits are sent to a remote agent. May be entered from a blocking link state and return to a blocking link state on an event, such as a timeout. Transmitter transmits flits. Receiver receives flits. May also exit to a low power link state. In some implementations, transmitting link state (TLS) can be referred to as the L0 state.

Blocking Link State: a link state. Transmitter and receiver are operating in a unified manner. May be a timed state during which the link layer flits are held off while the Physical layer information is communicated to the remote agent. May exit to a low power link state (or other link state based on the design). A blocking link state (BLS), in one embodiment, periodically occurs. The period is referred to as a BLS interval and may be timed, as well as may differ between slow speed and operational speed. Note that the link layer may be periodically blocked from sending flits so that a Physical layer control sequence of a length may be sent, such as during a transmitting link state or a partial width transmitting link state. In some implementations, blocking link state (BLS) can be referred to as a L0 control, or L0c, state.

Partial Width Transmitting Link State: Link state. May save power by entering a partial width state. In one embodiment asymmetric partial width refers to each direction of a two direction link having different widths, which may be supported in some designs. An example of an initiator, such as a transmitter, sending a partial width indication to enter partial width transmitting link state is shown in the example of FIG. 9. Here, a partial width indication is sent while transmitting on a link with a first width to transition the link to transmit at a second, new width. A mismatch may result in a reset. Note that speeds may not be altered but width may be. Therefore, flits are potentially sent at different widths. May be similar to a transmitting link state logically; yet, since there is a smaller width, it may take longer to transmit flits. May exit to other link states, such as a low power link state based on certain received and sent messages or an exit of the partial width transmitting link state or a link blocking state based on other events. In one embodiment, a transmitter port may turn idle lanes off in a staggered manner to provide better signal integrity (i.e. noise mitigation) as shown in the timing diagram. Here, non-retry-able flits, Such as Null flits, may be utilized during periods where the link width is changing. A corresponding receiver may drop these null flits and turn idle lanes off in a staggered manner, as well as record the current and previous lane maps in one or more structures. Note status and associated status register may remain unaltered. In some implementations, partial width transmitting link state can be referred to as a partial L0, or L0p, state.

Exit Partial Width Transmitting Link State: exit the partial width state. May or may not use a blocking link state in some implementations. The transmitter initiates exit, in one embodiment, by sending partial width exit patterns on the idle lanes to train and deskew them. As one example, an exit pattern start with EIEOS, which is detected and debounced to signal that the lane is ready to start the entry to a full transmitting link state, and may end with SDS or Fast Training Sequence (FTS) on idle lanes. Any failure during the exit sequence (receiver actions, such as deskew not completed prior to timeout) stops flit transfers to the link layer and asserts a reset, which is handled by resetting the link on the next blocking link state occurrence. The SDS may also initialize the scrambler/descrambler on the lanes to appropriate values.

Low Power Link State: is a lower power state. In one embodiment, it is lower power than the partial width link state, since signaling in this embodiment is stopped on all lanes and in both directions. Transmitters may use a blocking link state for requesting a low power link state. Here, receiver may decode the request and respond with an ACK or a NAK; otherwise reset may be triggered. In some implementations, low power link state can be referred to as a L1 state.

In one embodiment, two types of pin resets can be supported; power-on (or "cold") reset and warm reset. A reset initiated by software or originating (in the Physical or another layer) on one agent may be communicated in-band to the other agent. However, due to usage of an embedded clock, an in-band reset may be handled by communication to another agent using an ordered set, such as a specific electrical ordered set or EIEOS, as introduced above. Such ordered sets can be implemented as defined 16 Byte codes that may be represented in hexadecimal format, among other examples. The ordered set can be sent during initialization and a PHY control sequence (or "blocking link state") can be sent after initialization. The block link state can block the link layer from sending flits. As another example, link layer traffic may be blocked to send a few NULL flits which may be discarded at the receiver.

In some implementations of HPI, supersequences can be defined, each supersequence corresponding to a respective state or entry/exit to/from the respective state. A supersequence can include a repeating sequence of data sets and symbols. The sequences can repeat, in some instances, until completion of a state or state transition, or communication of a corresponding event, among other examples. In some instances, the repeating sequence of a supersequence can repeat according to a defined frequency, such as a defined number of unit intervals (UIs). A unit interval (UI) can correspond to the interval of time for transmitting a single bit on a lane of a link or system. In some implementations, the repeating sequence can begin with an electrically ordered set (EOS). Accordingly, an instance of the EOS can be expected to repeat in accordance with the predefined frequency. Such ordered sets can be implemented as defined 16 Byte codes that may be represented in hexadecimal format, among other examples. In one example, the EOS of a supersequence can be an electrically ordered electrical idle ordered set (or EIEIOS). In one example, an EIEOS can resemble a low frequency clock signal (e.g., a predefined number of repeating FF00 or FFF000 hexadecimal symbols, etc.). A predefined set of data can follow the EOS, such as a predefined number of training sequences or other data. Such supersequences can be utilized in state transitions including link state transitions as well as initialization, among other examples.

As introduced above, initialization, in one embodiment, can be done initially at slow speed followed by initialization at fast speed. Initialization at slow speed uses the default values for the registers and timers. Software then uses the slow speed link to setup the registers, timers and electrical parameters and clears the calibration semaphores to pave the way for fast speed initialization. As one example, initialization can consist of such states or tasks as Reset, Detect, Polling, and Configuration, among potentially others.

In one example, a link layer blocking control sequence (i.e. a blocking link state (BLS) or L0c state) can include a timed state during which the link layer flits are held off while the PHY information is communicated to the remote agent. Here, the transmitter and receiver may start a block control sequence timer. And upon expiration of the timers, the transmitter and receiver can exit the blocking state and may take other actions, such as exit to reset, exit to a different link state (or other state), including states that allow for the sending of flits across the link.

In one embodiment, link training can be provided and include the sending of one or more of scrambled training sequences, ordered sets, and control sequences, such as in connection with a defined supersequence. A training sequence symbol may include one or more of a header, reserved portions, a target latency, a pair number, a physical lane map code reference lanes or a group of lanes, and an initialization state. In one embodiment, the header can be sent with a ACK or NAK, among other examples. As an example, training sequences may be sent as part of supersequences and may be scrambled.

In one embodiment, ordered sets and control sequences are not scrambled or staggered and are transmitted identically, simultaneously and completely on all lanes. A valid reception of an ordered set may include checking of at least a portion of the ordered set (or entire ordered set for partial ordered sets). Ordered sets may include an electrically ordered set (EOS), such as an Electrical Idle Ordered Set (EIOS) or an EEOS. A supersequence may include a start of a data sequence (SDS) or a Fast Training Sequence (FTS). Such sets and control supersequences can be predefined and may have any pattern or hexadecimal representation, as well as any length. For example, ordered sets and supersequences may be a length of 8 bytes, 16, bytes, or 32 bytes, etc. FTS, as an example, can additionally be utilized for fast bit lock during exit of a partial width transmitting link state. Note that the FTS definition may be per lane and may utilize a rotated version of the FTS.

Supersequences, in one embodiment, can include the insertion of an EOS, such as an EIEOS, in a training sequence stream. When signaling starts, lanes, in one implementation, power-on in a staggered manner. This may result, however, in initial supersequences being seen truncated at the receiver on some lanes. Supersequences can be repeated however over short intervals (e.g., approximately one-thousand unit intervals (or ~1KUI)). The training supersequences may additionally be used for one or more of deskew, configuration and for communicating initialization target, lane map, etc. The EIEOS can be used for one or more of transitioning a lane from inactive to active state, screening for good lanes, identifying symbol and TS boundaries, among other examples.

Figure 8:
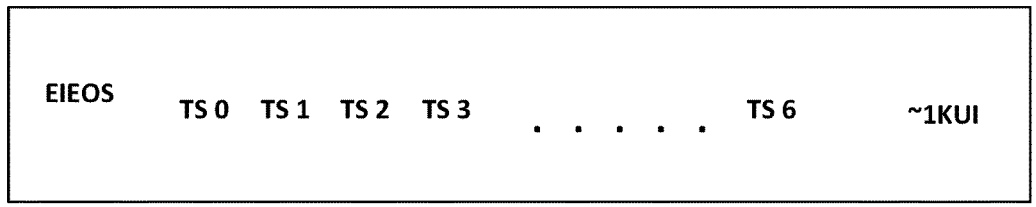
FIG. 8 illustrates example control supersequences.
Figure 8:
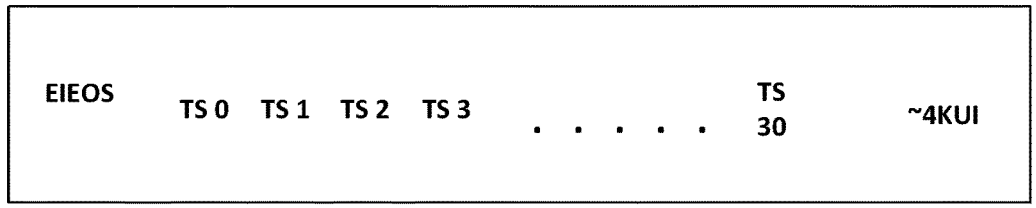
Figure 8:
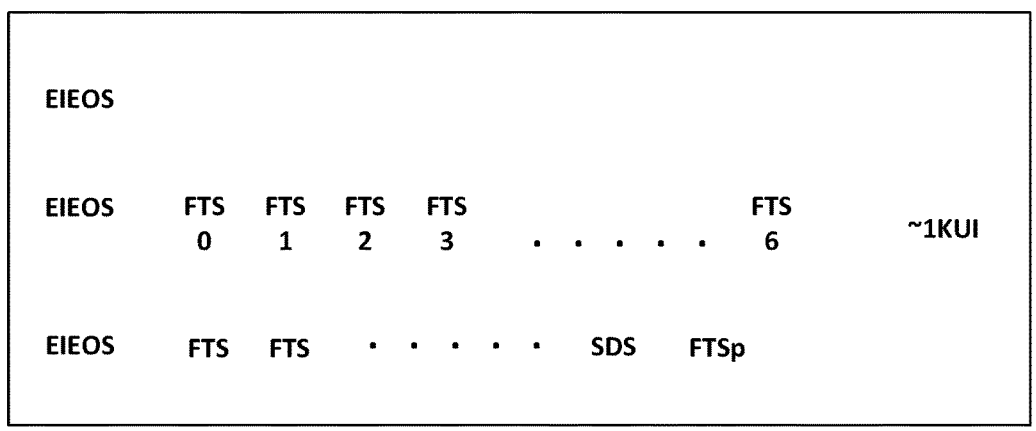

Turning to FIG. 8, representations of example supersequences are shown. For instance, an exemplary Detect supersequence 805 can be defined. The Detect supersequence 805 can include a repeating sequence of a single EIEOS (or other EOS) followed by a predefined number of instances of a particular training sequence (TS). In one example, the EIEOS can be transmitted, immediately followed by seven repeated instances of TS. When the last of the seven TSes is sent the EIEOS can be sent again followed by seven additional instances of TS, and so on. This sequence can be repeated according to a particular predefined frequency. In the example of FIG. 8, the EIEOS can reappear on the lanes approximately once every one thousand UIs (~1KUI) followed by the remainder of the Detect supersequence 805. A receiver can monitor lanes for the presence of a repeating Detect supersequence 805 and upon validating the supersequence 705 can conclude that a remote agent is present, has been added (e.g., hot plugged) on the lanes, has awoke, or is reinitializing, etc.

In another example, another supersequence 810 can be defined to indicate a polling, configuration, or loopback condition or state. As with the example Detect supersequence 805, lanes of a link can be monitored by a receiver for such a Poll/Config/Loop supersequence 810 to identify a polling state, configuration state, or loopback state or condition. In one example, a Poll/Config/Loop supersequence 810 can begin with an EIEOS followed by a predefined number of repeated instances of a TS. For instance, in one example the EIEOS can be followed by thirty-one (31) instances of TS with the EIEOS repeating approximately every four thousand UI (e.g., ~4KUI).

Further, in another example, a partial width transmitting state (PWTS) exit supersequence 815 can be defined. In one example, a PWTS exit supersequence can include an initial EIEOS to repeat to pre-condition lanes in advance of the sending of the first full sequence in the supersequence. For instance, the sequence to be repeated in supersequence 815 can begin with an EIEOS (to repeat approximately once every 1KUI). Further, fast training sequences (FTS) can be utilized in lieu of other training sequences (TS), the FTS configured to assist in quicker bit lock, byte lock, and deskewing. In some implementations, an FTS can be unscrambled to further assist in bringing idle lanes back to active as quickly and non-disruptively as possible. As with other supersequences preceding an entry into a link transmitting state, the supersequence 815 can be interrupted and ended through the sending of a start of data sequence (SDS). Further, a partial FTS (FTSp) can be sent to assist in synchronizing the new lanes to the active lanes, such as by allowing bits to be subtracted (or added) to the FTSp, among other examples.

Supersequences, such as Detect supersequence 705 and Poll/Config/Loop supersequence 710, etc. can potentially be sent substantially throughout the initialization or re-initialization of a link. A receiver, upon receiving and detecting a particular supersequence can, in some instances, respond by echoing the same supersequence to the transmitter over the lanes. The receiving and validation of a particular supersequence by transmitter and receiver can serve as a handshake to acknowledge a state or condition communicated through the supersequence. For instance, such a handshake (e.g., utilizing a Detect supersequence 705) can be used to identify reinitialization of a link. In another example, such a handshake can be utilized to indicate the end of an electrical reset or low power state, resulting in corresponding lanes being brought back up, among other examples. The end of the electrical reset can be identified, for instance, from a handshake between transmitter and receiver each transmitting a Detect supersequence 705.

In another example, lanes can be monitored for supersequences and use the supersequences in connection with the screening of lanes for detect, wake, state exits and entries, among other events. The predefined and predictable nature and form of supersequences can be further used to perform such initialization tasks as bit lock, byte lock, debouncing, descrambling, deskewing, adaptation, latency fixing, negotiated delays, and other potential uses. Indeed, lanes can be substantially continuously monitored for such events to quicken the ability of the system to react to and process such conditions. In the case of debouncing, transients can be introduced on lanes as a result of a variety of conditions. For instance, the addition or powering-on of a device can introduce transients onto the lane. Additionally, voltage irregularities can be presented on a lane because of poor lane quality or electrical failure. Such irregularities can be readily detected on supersequences with predictable values, such as when values of an EIEOS unexpectedly deviate in connection with transients or other bit errors.

In one example, a transmitting device can attempt to enter a particular state. For instance, the transmitting device can attempt to activate the link and enter an initialization state. In another example, the transmitting device can attempt to exit a low power state, such as an L1 state, among other examples. In some instances of an L1 state, the L1 state can serve as a power savings, idle, or standby state. Indeed, in some examples, main power supplies may remain active in the L1 state. In exiting an L1 state, a first device can send a supersequence associated with transitioning from the L1 state to a particular other state, such as an L0 transmitting link state (TLS). The supersequence, as in other examples, can be a repeating sequence of an EOS followed by a predetermined number of TSes such that the EOS is repeated at a particular predefined frequency. In one examples, a Detect supersequence can be used to exit the L1 or other low power state. A receiving device can receive and validate the data, identifying the supersequence, and the receiving device can complete the handshake with the transmitting device by sending the supersequence back to the transmitting device.

With both the transmitting and receiving devices receiving the same supersequence, each device can further perform additional initialization tasks utilizing the supersequences. For instance, each device can perform debouncing, bit lock, byte lock, descrambling, and deskewing utilizing the supersequences. Additional initialization information can be communicated through the headers and payloads of the TSes included in the supersequences. When the link is initialized, a start data send (SDS) sequence can be sent, in some cases, interrupting the supersequence (e.g., sent in the middle of a TS or EIEOS) and the respective devices on either side of the link can prepare for the synchronized entry into TLS. In TLS, or an "L0" state, supersequences can be ended and flits can be transmitted utilizing the Link layer of the protocol stack.

While in TLS, the Physical layer may still be provided limited opportunities to perform control tasks. For instance, bit errors and other errors may be identified on one or more lanes during an L0 state. In one implementation, a control state L0c can be provided. The L0c state can be provided as a periodic window within the TLS to allow Physical layer control messages to be sent between streams of flits sent through the Link layer. For instance, as represented in the example illustrated in FIG. 9, an L0 state can be subdivided into L0c intervals. Each L0c interval can begin with a L0c state or window (e.g., 905) in which Physical layer control codes and other data can be sent. The remainder (e.g., 910) of the L0c interval can be dedicated to the sending of flits. The length of the L0c interval and L0c state in each interval can be programmatically defined, for instance by BIOS of one or more devices or another software-based controller, among other examples. The L0c state can be exponentially shorter than the remainder of an L0c interval. For instance, in one example, the L0c can be 8UI while the remainder of the L0c interval is on the order of 4KUI, among other examples. This can allow windows in which relatively short, predefined messages can be sent without substantially disrupting or wasting link data bandwidth.

L0c state message can communicate a variety of conditions at the Physical layer level. In one example, one device can initiate a reset of the link or a lane, for instance, based on bit errors or other errors in excess of a particular threshold amount. Such errors can also be communicated in L0c windows (such as preceding L0c windows). The L0c state can also be leveraged to realize other in-band signaling, such as signaling for use in aiding or triggering transitions between other link states. In one example, L0c messages can be utilized to transition a link from an active L0 state to a standby or low power state, such as an L1 state. As shown in the simplified flow diagram of FIG. 10, a particular L0c state can be used to communicate a L1 entry request (e.g., 1010). Further flits (e.g., 1020, 1030) can be sent while the device (or agent on the device) waits for an acknowledgement of the request 1010. The other device on the link can send the acknowledgement (e.g., 1040). In some examples, the acknowledgement can also be sent in a L0c window. In some instances, the acknowledgement can be sent in the next L0c window following receipt/sending of the L1 request 1010. Timers can be employed to synchronize the L0c intervals at each device and the requesting device can identify the acknowledgement 1040 as an acknowledgement of the request 1010 (e.g., rather than an independent L1 entry request) based on an identification that the acknowledgement 1040 was sent at the next L0c window, among other examples. In some instances, an acknowledgement can be communicated through an L0c code distinct from that used in the L1 entry request 1010. In other instances, the acknowledgement 1040 can include the echoing of the L1 entry request code used in request 1010, among other examples. Further, in alternative examples, a non-acknowledge signal or NAK can be communicated in the L0c window.

In addition (or as an alternate) to handshaking using L0c codes, supersequences, such as Detect supersequence, can be sent in connection with resetting and re-initializing the link. Further handshaking can occur between the devices as the supersequences sent by a first device and echoed by the second, receiving device. Supersequences can be used, as described above, to assist in the reinitialization of the link including debouncing, bit lock, byte lock, descrambling, and deskewing the lanes of the link. Further, the devices can utilize the timer (e.g., embodying the L0c interval) to synchronize entry of the devices and the link into the requested L1 state. For instance, receipt of the acknowledgement 1040 can indicate to the devices that they are to mutually enter (or begin entering) the L1 state at the end of the L0c interval corresponding to the L0c window in which the acknowledgement was sent, among other examples. For instance, data sent in an L0c window included in or otherwise associated with the acknowledgement 1040 can indicate the time at which the devices are to enter the L1 state, among other potential examples. Additional flits (e.g., 1050), in some instances, can be sent while the devices await the timeout corresponding to the transition into the L1 state.

In some implementations of HPI, links can be established upon any number of two or more lanes. Further, a link can be initialized at a first number of lanes and later transition to a partial width state such that only a portion of the number of lanes is used. The partial width state can be designated as a lower power state, such as a L0p state. In one example, an L0c state can be used to transition from a L0 state where the first number of lanes is active to an L0p state where a lesser number of lanes are to be active. For instance, as shown in the example of FIG. 11, an link can be active at a first width 1110. In some instances, the first width can be the full width (e.g., at L0). In other instances, the link can transition from a first L0p state utilizing a first number of lanes to another L0p using a different number (or set) of lanes, among other examples. During a L0c window of the lanes in the first width, a L0p entry code 1120 can be transmitted. The L0p entry request 1120 can identify what new width should be applied. In some instances, the new link width can be predetermined and identified simply from the receipt of the L0p request 1120. Additionally, the particular lanes to be dropped in the partial width state can also be specified or otherwise identified or preconfigured in connection with the L0p request 1120, among other examples.

Continuing with the example of FIG. 11, flits or other data can continue to be sent across the full width of lanes while the link awaits transition into the L0p state. For instance, a duration t can be specified by synchronized timers at the devices connected through the link to synchronize entry into the L0p state. In one example, the duration t can correspond to a remainder of a L0c interval corresponding to the request 1120. At the end of the interval a portion of the lanes will remain active while another portion of the lanes are put into an inactive or idle state. The link will then operate at the new width (e.g., 1140), at least until an L0p exit request or other link width transition request is received, among other examples.

HPI can utilize one or more power control units (PCU) to assist in timing transitions between an L0 state and lower power states, such as L0p and L1. Further, HPI can support master-slave, master-master and other architectures. For instance, a PCU may be present on or otherwise associated with only one of the devices connected on a link and the device having the PCU can be considered the master. Master-master configurations can be realized, for instance, when both devices have an associated PCU which can prompt a link state transition. Some implementations can specify a minimum stay for a particular low power state, such as L0p or L1, for example, to attempt minimize transitions between states and attempt to maximize power savings within an entered low power state, among other examples.

Exiting from a partial width low power state can be adapted to take place efficiently and quickly so as to minimize the impact and interruption of the active lanes. In some implementations, L0c windows and codes can also be used to trigger an exit from an L0p or other state to reactive idle lanes. Turning, for instance, to the examples of FIG. 12, a simplified flow diagram is shown illustrating an example exit from an L0p state. In the particular example of FIG. 12, flit data (e.g., 1205) can be sent when an L0c window 1210 is encountered in which a L0 entry (or L0p exit) request is included. Additional flits 1215 can be sent prior to the point at which the L0p exit is to occur. As in other examples, an L0c code 1210 can include identification of or implicitly identify a time at which a state transition is to begin/end as well as particular events of the state transition. Flits (e.g., 1215) can continue to be sent to maximize data transfer while the devices anticipate to enter the state transition.

In one example, an EIEOS 1220 (or other data such another EOS) can be sent on the inactive lanes to begin conditioning the lanes. In some instances, such inactive lanes (e.g., lanes "n+1" through "z") may have been inactive for some time and waking the lanes can introduce electrical transients and other instability. Accordingly, the EIEOS 1220, as well as partial width supersequences sent in connection with the exit from the L0p state can be used to debounce the lanes as they awake. Further, in some instances, transients on the waking lanes (e.g., lanes "n+1" through "z") can potentially affect the active lanes (e.g., lanes "0" through "n"). To prevent against irregularities stemming from the re-awakening of the idle lanes negatively impacting the active lanes, the active lanes can be synchronized to send null flits (e.g., at 1225) at or immediately prior to the initial signals (e.g., 1220) being sent over the waking lanes.

In some implementations, re-initialization of the idle lanes can be timed to begin, such as at the conclusion of a corresponding L0c interval. In other instances, an alternative time can be employed to start re-initialization early. In such instances, a transmitter of the L0p exit request can cause the idle lanes to be pre-conditioned, for instance, through the sending of one or more single EIEOSes. The sending of such conditioning signals can be coordinated with the active lanes so that null flits are sent momentarily on the active lanes to coincide with the initial sending of the EIEOS and protect the active lanes from interfering transients at the start-up of the idle lanes, among other examples. For instance, Link layer buffers can be alternatively or additionally used to protect against bit loss resulting from such transients in reawaking idle lanes, among other techniques.

Further, in some implementations, following the sending of an initial EIEOS (or supersequence) a partial width state exit supersequence (e.g., 1230) can be sent. At least a portion of the supersequence can be repeated on the active lanes (e.g., at 1225). Further, the device receiving supersequence 1225 can echo the supersequence to handshake and acknowledge the state transition, among other examples. The sending of the supersequence (e.g., 1230) can be further used to perform bit lock, byte lock, debouncing, descrambling, and deskew. For instance, the reactivated lanes can be deskewed against the active lanes. In some instances, the initial configurations determined for the idle lanes in the original initialization of the link can be accessed and applied, although, in other instances, the idle character of the lanes can result in changes to the skew and other lane characteristics resulting in the effective re-initialization of the idle lanes.

Returning briefly to FIG. 8, one example is represented of sequences that can be sent in connection with a partial width transmitting state exit (e.g., a transition from a L0p state to an L0 state). As lanes are to remain active before and after such a transition, a premium can be placed on accelerating the state transition so as to provide minimal disruption to the active lanes. In one example, a partial supersequence can be sent (e.g., as in 1220 of FIG. 12) without the subsequent training sequences to expedite debouncing. For instance, transients can be attempted to be resolved within the first EIEOS without waiting another 1KUI for a second complete EIEOS to be sent to begin bit lock, byte lock, deskew, and other tasks. Further the full partial width transmitting state exit supersequence can include a repeating sequence of an EOS (e.g., EIEOS) followed by a predefined number of training sequences. In the example of FIG. 8, an EIEOS can be sent followed by a series of training sequence (e.g., seven consecutive training sequences). In one implementation, rather than sending a full training sequence (such as a "TS" used in supersequences 805, 810) an abbreviated "fast training sequence" (or FTS) can be sent. The symbols of the FTS can be optimized to assist with the quick bit and byte lock and deskewing of the reactivated lanes, among other features. In one example, the FTS can be less than 150UI in length (e.g., 128UI). Further, FTSes can be left unscrambled so as to further assist in quick recovery of the idle lanes.

As shown in the third row of element 815, a partial width transmitting state exit supersequence can also be interrupted by an SDS once a controller has determined that the reactivated lanes have been effectively initialized. In one example, a partial FTS (or FTSp) can follow the SDS to assist with synchronizing the reactivated lane with the active lanes (e.g., once bit lock, byte lock, and deskewing have been completed). For instance, the bit length of the FTSp can be set to correspond to a clean flit boundary for the final width between the reactivated lanes and the active lanes. To facilitate fast synchronization of the lane, bits can be added or subtracted from a lane at the receiver prior or during the FTSp to account for the skew. Alternatively, or in addition, bits can also be added or subtracted to the lane at the receiver prior or during the SDS to facilitate deskewing of a newly activated lane, among other examples.

Figure 12:
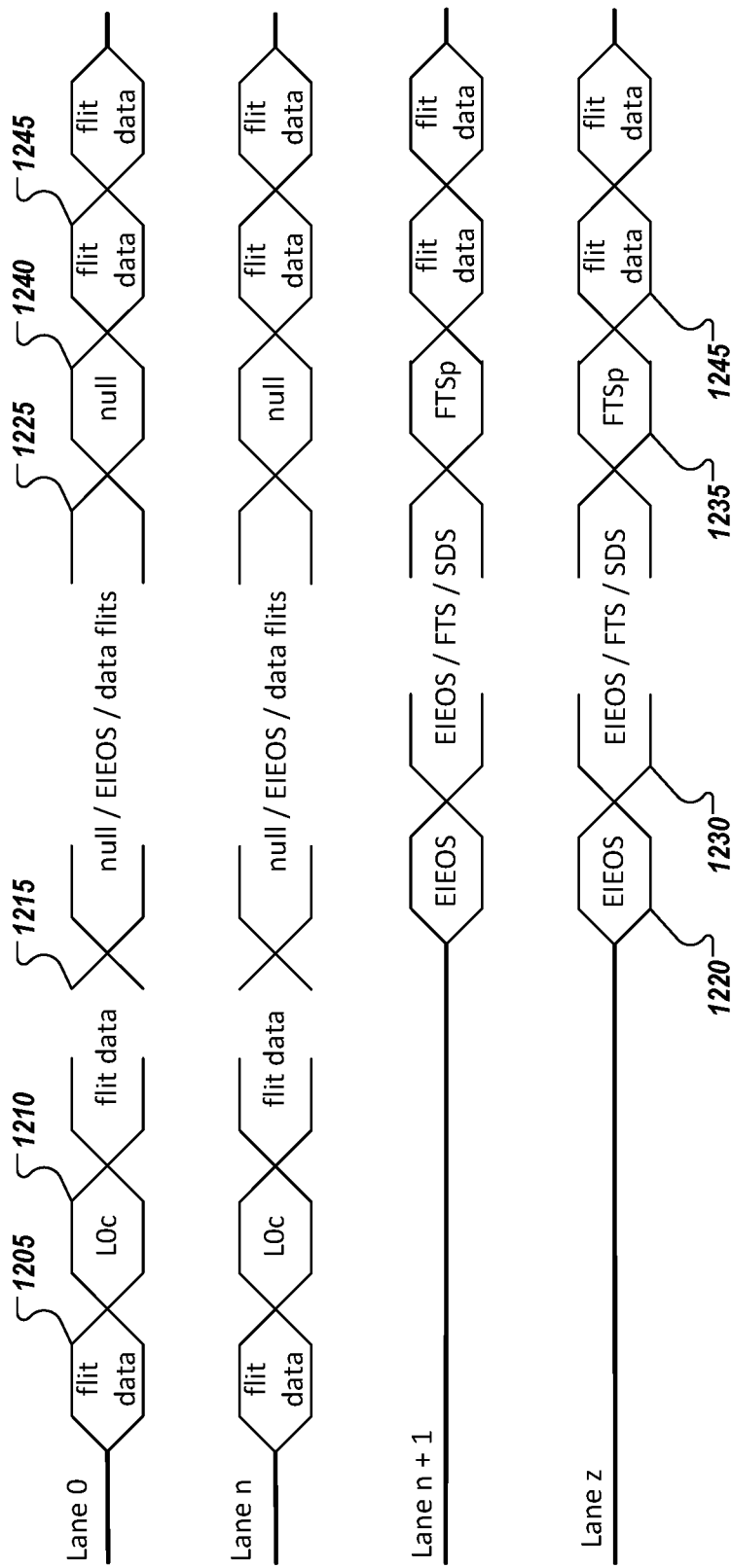
FIG. 12 illustrates an example transition from a partial width state.

Returning to the discussion of FIG. 12, transmission of data flits can be resumed on active lanes (e.g., lanes 0 through n) (e.g., at 1225) while initialization of the waking lanes completes in some examples. For instance, once debouncing has been resolved, link layer transmissions can resume. In some instances, flit transmission can be momentarily interrupted (e.g., at 1240) in connection with the final reactivation and synchronization of the previously idle lanes (e.g., lanes n+1 through z) (e.g., in connection with the sending of an FTSp 1235). With the lanes restored, flit data 1245 can then resume on all lanes.

In one embodiment, the clock can be embedded in the data so there are no separate clock lanes. The flits sent over the lanes can be scrambled to facilitate clock recovery. The receiver clock recovery unit, as one example, can deliver sampling clocks to a receiver (i.e. the receiver recovers clock from the data and uses it to sample the incoming data). Receivers in some implementations continuously adapt to an incoming bit stream. By embedding the clock, pinout can be potentially reduced. However, embedding the clock in the in-band data can alter the manner in which in-band reset is approached. In one embodiment, a blocking link state (BLS) can be utilized after initialization. Also, electrical ordered set supersequences may be utilized during initialization to facilitate the reset (e.g., as described above), among other considerations. The embedded clock can be common between the devices on a link and the common operational clock can be set during calibration and configuration of the link. For instance, HPI links can reference a common clock with drift buffers. Such implementation can realize lower latency than elastic buffers used in non-common reference clocks, among other potential advantages. Further, the reference clock distribution segments may be matched to within specified limits.

As noted above, an HPI link can be capable of operating at multiple speeds including a "slow mode" for default power-up, initialization, etc. The operational (or "fast") speed or mode of each device can be statically set by BIOS. The common clock on the link can be configured based on the respective operational speeds of each device on either side of the link. For instance, the link speed can be based on the slower of the two device operations speeds, among other examples. Any operational speed change may be accompanied by a warm or cold reset.

In some examples, on power-on, the link initializes to Slow Mode with transfer rate of, for example, 100 MT/s. Software then sets up the two sides for operational speed of the link and begins the initialization. In other instances, a sideband mechanism can be utilized to set up a link including the common clock on the link, for instance, in the absence or unavailability of a slow mode.

A slow mode initialization phase, in one embodiment, can use the same encoding, scrambling, training sequences (TS), states, etc. as operational speed but with potentially fewer features (e.g., no electrical parameter setup, no adaptation, etc.). Slow mode operation phase can also potentially use the same encoding, scrambling etc. (although other implementations may not) but may have fewer states and features compared to operational speed (e.g., no low power states).

Further, slow mode can be implemented using the native phase lock loop (PLL) clock frequency of the device. For instance, HPI can support an emulated slow mode without changing PLL clock frequency. While some designs may use separate PLLs for slow and fast speed, in some implementations of HPI emulated slow mode can be achieved by allowing the PLL clock to runs at the same fast operational speed during slow mode. For instance, a transmitter can emulate a slower clock signal by repeating bits multiple times so as to emulate a slow high clock signal and then a slow low clock signal. The receiver can then oversample the received signal to locate edges emulated by the repeating bits and identify the bit. In such implementations, ports sharing a PLL may coexist at slow and fast speeds.

A common slow mode speed can be initialized between two devices. For instance, the two devices on a link may have different fast operational speeds. A common slow mode speed can be configured, for instance, during a discovery phase or state on the link. In one example, an emulation multiple can be set as an integer (or non-integer) ratio of fast speed to slow speed, and the different fast speeds can be down-converted to work with the same slow speed. For instance, two device agents which support at least one common frequency may be hot attached irrespective of the speed at which the host port is running. Software discovery may then use the slow mode link to identify and setup the most optimal link operational speeds. Where the multiple is an integer ratio of fast speed to slow speed, different fast speeds may work with the same slow speed, which may be used during the discovery phase (e.g., of hot attach).

In some implementations of HPI, adaptation of lanes on a link can be supported. The Physical layer can support both receiver adaptation and transmitter, or sender, adaptation. With receiver adaptation, the transmitter on a lane can send sample data to the receiver which the receiver logic can process to identify shortcomings in the electrical characteristics of the lane and quality of the signal. The receiver can then make adjustments to the calibration of the lane to optimize the lane based on the analysis of the received sample data. In the case of transmitter adaptation, the receiver can again receive sample data and develop metrics describing the quality of the lane but in this case communicate the metrics to the transmitter (e.g., using a backchannel, such as a software, hardware, embedded, sideband or other channel) to allow the transmitter to make adjustments to the lane based on the feedback. Receiver adaptation can be initiated at the start of the Polling state using the Polling supersequence sent from the remote transmitter. Similarly, transmitter adaptation can be done by repeating the following for each transmitter parameters. Both agents can enter Loopback Pattern state as masters and transmit specified pattern. Both receivers can measure the metric (e.g. BER) for that particular transmitter setting at a remote agent. Both agents can go to Loopback .Marker state and then Reset and use backchannels (slow mode TLS or sideband) to exchange metrics. Based on these metrics, the next transmitter setting can be identified. Eventually the optimal transmitter setting can be identified and saved for subsequent use.

As both devices on a link can run off the same reference clock (e.g., ref clk), elasticity buffers can be omitted (any elastic buffers may be bypassed or used as drift buffers with lowest possible latency). However, phase adjustment or drift buffers can be utilized on each lane to transfer the respective receiver bitstream from the remote clock domain to the local clock domain. The latency of the drift buffers may be sufficient to handle sum of drift from all sources in electrical specification (e.g., voltage, temperature, the residual SSC introduced by reference clock routing mismatches, and so on) but as small as possible to reduce transport delay. If the drift buffer is too shallow, drift errors can result and manifest as series of CRC errors. Consequently, in some implementations, a drift alarm can be provided which can initiate a Physical layer reset before an actual drift error occurs, among other examples.

Some implementations of HPI may support the two sides running at a same nominal reference clock frequency but with a ppm difference. In this case frequency adjustment (or elasticity) buffers may be needed and can be readjusted during an extended BLS window or during special sequences which would occur periodically, among other examples.

The operation of the HPI PHY logical layer can be independent of the underlying transmission media provided the latency does not result in latency fixing errors or timeouts at the link layer, among other considerations.

External interfaces can be provided in HPI to assist in management of the Physical layer. For instance, external signals (from pins, fuses, other layers), timers, control and status registers can be provided. The input signals may change at any time relative to PHY state but are to be observed by the Physical layer at specific points in a respective state. For example, a changing alignment signal (as introduced below) may be received but have no effect after the link has entered a transmitting link state, among other examples. Similarly command register values can be observed by Physical layer entities only at specific points in time. For instance, Physical layer logic can take a snapshot of the value and use it in subsequent operations. Consequently, in some implementations, updates to command registers may be associated with a limited subset of specific periods (e.g., in a transmitting link state or when holding in Reset calibration, in slow mode transmitting link state) to avoid anomalous behavior.

Since status values track hardware changes, the values read may depend on when they are read. Some status values, however, such as link map, latency, speed, etc., may not change after initialization. For instance, a re-initialization (or low power link state (LPLS), or L1 state, exit) is the only thing which may cause these to change (e.g., a hard lane failure in a TLS may not result in reconfiguration of link until re-initialization is triggered, among other examples).

Interface signals can include signals that are external to but affect Physical layer behavior. Such interface signals can include, as examples, encoding and timing signals. Interface signals can be design specific. These signals can be an input or output. Some interface signals, such as termed semaphores and prefixed EO among other examples, can be active once per assertion edge, i.e., they may be deasserted and then reasserted to take effect again, among other examples. For instance, Table 1 includes an example listing of example functions:

TABLE 1

| Function |
| --- |
| input pin reset (aka warm reset) |
| input pin reset (aka cold reset) |
| input in-band reset pulse; causes semaphore to be set; semaphore is cleared when in-band reset occurs |
| input enables low power states |
| input loopback parameters; applied for loopback pattern |
| input to enter PWLTS |
| input to exit PWLTS |
| input to enter LPLS |
| input to exit LPLS |
| input from idle exit detect (aka squelch break) |
| input enables use of CPhyInitBegin |
| input from local or planetary alignment for transmitter to exit initialization |
| output when remote agent NAKs LPLS request |
| output when agent enters LPLS |
| output to link layer to force non-retryable flits |
| output to link layer to force NULL flits |
| output when transmitter is in partial width link transmitting state (PWLTS) |
| output when receiver is in PWLTS |

CSR timer default values can be provided in pairs—one for slow mode and one for operational speed. In some instances, the value 0 disables the timer (i.e., timeout never occurs). Timers can include those shown in Table 2, below. Primary timers can be used to time expected actions in a state. Secondary timers are used for aborting initializations which are not progressing or for making forward state transitions at precise times in an automated test equipment (or ATE) mode. In some cases, secondary timers can be much larger than the primary timers in a state. Exponential timer sets can be suffixed with exp and the timer value is 2 raised to the field value. For linear timers, the timer value is the field value. Either timer could use different granularities. Additionally, some timers in the power management section can be in a set called a timing profile. These can be associated with a timing diagram of the same name.

TABLE 2

| Timers |
| --- |
| Table Tpriexp Set |
| Reset residency for driving EIEOS |
| Receiver calibration minimum time; for stagger transmitter off |
| Transmitter calibration minimum time; for stagger on |
| Tsecexp Set |
| Timed receiver calibration |
| Timed transmitter calibration |
| Squelch exit detect/debounce |
| DetectAtRx overhang for handshake |
| Adapt + bitlock/bytelock/deskew |
| Configure link widths |
| Wait for planetary aligned clean flit boundary |
| Re-bytelock/deskew |
| Tdebugexp Set |
| For hot plug; non-0 value to debug hangs |
| TBLSentry Set |
| BLS entry delay - fine |
| BLS entry delay - coarse |
| TBLS Set |
| BLS duration for transmitter |
| BLS duration for receiver |
| BLS clean flit interval for transmitter |
| TBLS clean flit interval for receiver |

Command and control registers can be provided. Control registers can be late action and may be read or written by software in some instances. Late-action values can take effect (e.g., pass through from software-facing to hardware-facing stage) continuously in Reset. Control semaphores (prefixed CP) are RW1S and can be cleared by hardware. Control registers may be utilized to perform any of the items described herein. They may be modifiable and accessible by hardware, software, firmware, or a combination thereof.

Status registers can be provided to track hardware changes (written and used by hardware) and can be read-only (but debug software may also be able to write to them). Such registers may not affect interoperability and can be typically complemented with many private status registers. Status semaphores (prefixed SP) can be mandated since they may be cleared by software to redo the actions which set the status. Default means initial (on reset) values can be provided as a subset of these status bits related to initialization. On an initialization abort, this register can be copied into a storage structure.

Tool Box registers can be provided. For instance, testability tool-box registers in the Physical layer can provide pattern generation, pattern checking and loop back control mechanisms. Higher-level applications can make use of these registers along with electrical parameters to determine margins. For example, Interconnect built in test may utilize this tool-box to determine margins. For transmitter adaptation, these registers can be used in conjunction with the specific registers described in previous sections, among other examples.

In some implementations, HPI supports Reliability, Availability, and Serviceability (RAS) capabilities utilizing the Physical layer. In one embodiment, HPI supports hot plug and remove with one or more layers, which may include software. Hot remove can include quiescing the link and an initialization begin state/signal can be cleared for the agent to be removed. A remote agent (i.e. the one that is not being removed (e.g., the host agent)) can be set to slow speed and its initialization signal can also be cleared. An in-band reset (e.g., through BLS) can cause both agents to wait in a reset state, such as a Calibrate Reset State (CRS); and the agent to be removed can be removed (or can be held in targeted pin reset, powered down), among other examples and features. Indeed, some of the above events may be omitted and additional events can be added.

Hot add can include initialization speed can default to slow and an initialization signal can be set on the agent to be added. Sottware can set speed to slow and may clear the initialization signal on the remote agent. The link can come up in slow mode and software can determine an operational speed. In some cases, no PLL relock of a remote is performed at this point. Operational speed can be set on both agents and an enable can be set for adaptation (if not done previously). The initialization begin indicator can be cleared on both agents and an in-band BLS reset can cause both agents to wait in CRS. Software can assert a warm reset (e.g., a targeted or self-reset) of an agent (to be added), which may cause a PLL to relock. Software may also set the initialization begin signal by any known logic and further set on remote (thus advancing it to Receiver Detect State (RDS)). Software can de-assert warm reset of the adding agent (thus advancing it to RDS). The link can then initialize at operational speed to a Transmitting Link State (TLS) (or to Loopback if the adaption signal is set), among other examples. Indeed, some of the above events may be omitted and additional events can be added.

Data lane failure recovery can be supported. A link in HPI, in one embodiment, can be resilient against hard error on a single lane by configuring itself to less than full width (e.g. less than half the full width) which can thereby exclude the faulty lane. As an example, the configuration can be done by link state machine and unused lanes can be turned off in the configuration state. As a result, the flit may be sent across at a narrower width, among other examples.

In some implementations of HPI, lane reversal can be supported on some links. Lane reversal can refer, for instance, to lanes 0/1/2 . . . of a transmitter connected to lanes n/n−1/n−2 . . . of a receiver (e.g. n may equal 19 or 7, etc.). Lane reversal can be detected at the receiver as identified in a field of a TS header. The receiver can handle the lane reversal by starting in a Polling state by using physical lane n . . . 0 for logical lane 0 . . . n. Hence, references to a lane may refer to a logical lane number. Therefore, board designers may more efficiently lay down the physical or electrical design and HPI may work with virtual lane assignments, as described herein. Moreover, in one embodiment, polarity may be inverted (i.e. when a differential transmitter +/− is connected to receiver −/+. Polarity can also be detected at a receiver from one or more TS header fields and handled, in one embodiment, in the Polling State.

Figure 13:
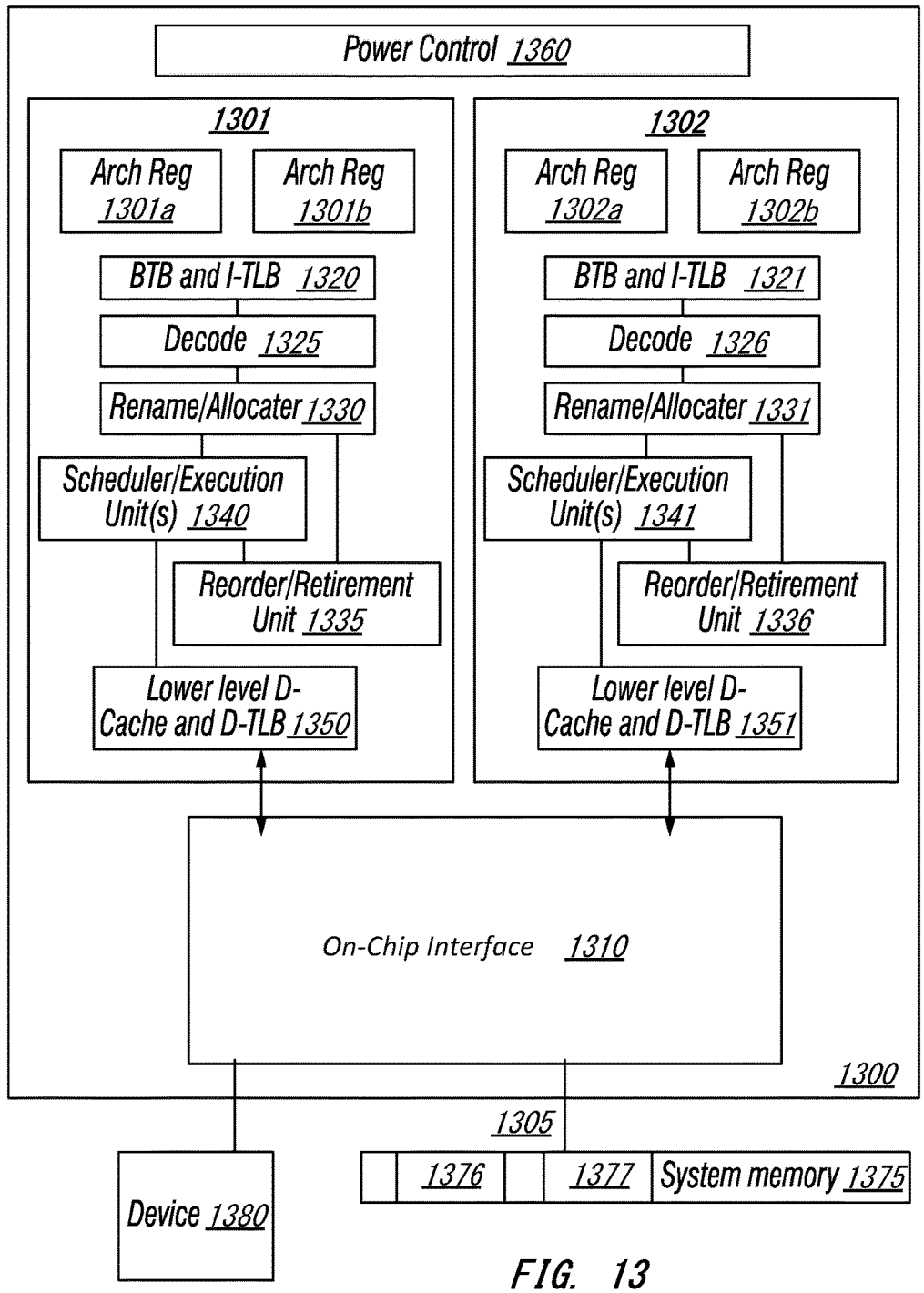
FIG. 13 illustrates an embodiment of a block diagram for a computing system including a multicore processor.

Referring to FIG. 13, an embodiment of a block diagram for a computing system including a multicore processor is depicted. Processor 1300 includes any processor or processing device, such as a microprocessor, an embedded processor, a digital signal processor (DSP), a network processor, a handheld processor, an application processor, a co-processor, a system on a chip (SOC), or other device to execute code. Processor 1300, in one embodiment, includes at least two cores—core 1301 and 1302, which may include asymmetric cores or symmetric cores (the illustrated embodiment). However, processor 1300 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1300, as illustrated in FIG. 13, includes two cores-core 1301 and 1302. Here, core 1301 and 1302 are considered symmetric cores, i.e. cores with the same configurations, functional units, and/or logic. In another embodiment, core 1301 includes an out-of-order processor core, while core 1302 includes an in-order processor core. However, cores 1301 and 1302 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1301 are described in further detail below, as the units in core 1302 operate in a similar manner in the depicted embodiment.

As depicted, core 1301 includes two hardware threads 1301a and 1301b, which may also be referred to as hardware thread slots 1301a and 1301b. Therefore, software entities, such as an operating system, in one embodiment potentially view processor 1300 as four separate processors. i.e., four logical processors or processing elements capable of executing four software threads concurrently. As alluded to above, a first thread is associated with architecture state registers 1301a, a second thread is associated with architecture state registers 1301b, a third thread may be associated with architecture state registers 1302a, and a fourth thread may be associated with architecture state registers 1302b. Here, each of the architecture state registers (1301a, 1301b, 1302a, and 1302*b*) may be referred to as processing elements, thread slots, or thread units, as described above. As illustrated, architecture state registers 1301*a* are replicated in architecture state registers 1301*b*, so individual architecture states/contexts are capable of being stored for logical processor 1301*a* and logical processor 1301*b*. In core 1301, other smaller resources, such as instruction pointers and renaming logic in allocator and renamer block 1330 may also be replicated for threads 1301*a* and 1301*b*. Some resources, such as re-order buffers in reorder/retirement unit 1335, ILTB 1320, load/store buffers, and queues may be shared through partitioning. Other resources, such as general purpose internal registers, page-table base register(s), low-level data-cache and data-TLB 1315, execution unit(s) 1340, and portions of out-of-order unit 1335 are potentially fully shared.

Processor 1300 often includes other resources, which may be fully shared, shared through partitioning, or dedicated by/to processing elements. In FIG. 13, an embodiment of a purely exemplary processor with illustrative logical units/resources of a processor is illustrated. Note that a processor may include, or omit, any of these functional units, as well as include any other known functional units, logic, or firmware not depicted. As illustrated, core 1301 includes a simplified, representative out-of-order (OOO) processor core. But an in-order processor may be utilized in different embodiments. The OOO core includes a branch target buffer 1320 to predict branches to be executed/taken and an instruction-translation buffer (I-TLB) 1320 to store address translation entries for instructions.

Core 1301 further includes decode module 1325 coupled to fetch unit 1320 to decode fetched elements. Fetch logic, in one embodiment, includes individual sequencers associated with thread slots 1301*a*, 1301*b*, respectively. Usually core 1301 is associated with a first ISA, which defines/specifies instructions executable on processor 1300. Often machine code instructions that are part of the first ISA include a portion of the instruction (referred to as an opcode), which references/specifies an instruction or operation to be performed. Decode logic 1325 includes circuitry that recognizes these instructions from their opcodes and passes the decoded instructions on in the pipeline for processing as defined by the first ISA. For example, as discussed in more detail below decoders 1325, in one embodiment, include logic designed or adapted to recognize specific instructions, such as transactional instruction. As a result of the recognition by decoders 1325, the architecture or core 1301 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1326, in one embodiment, recognize the same ISA (or a subset thereof). Alternatively, in a heterogeneous core environment, decoders 1326 recognize a second ISA (either a subset of the first ISA or a distinct ISA).

In one example, allocator and renamer block 1330 includes an allocator to reserve resources, such as register files to store instruction processing results. However, threads 1301*a* and 1301*b* are potentially capable of out-of-order execution, where allocator and renamer block 1330 also reserves other resources, such as reorder buffers to track instruction results. Unit 1330 may also include a register renamer to rename program/instruction reference registers to other registers internal to processor 1300. Reorder/retirement unit 1335 includes components, such as the reorder buffers mentioned above, load buffers, and store buffers, to support out-of-order execution and later in-order retirement of instructions executed out-of-order.

Scheduler and execution unit(s) block 1340, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1350 are coupled to execution unit(s) 1340. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1301 and 1302 share access to higher-level or further-out cache, such as a second level cache associated with on-chip interface 1310. Note that higher-level or further-out refers to cache levels increasing or getting further way from the execution unit(s). In one embodiment, higher-level cache is a last-level data cache—last cache in the memory hierarchy on processor 1300—such as a second or third level data cache. However, higher level cache is not so limited, as it may be associated with or include an instruction cache. A trace cache—a type of instruction cache instead may be coupled after decoder 1325 to store recently decoded traces. Here, an instruction potentially refers to a macro-instruction (i.e. a general instruction recognized by the decoders), which may decode into a number of micro-instructions (micro-operations).

In the depicted configuration, processor 1300 also includes on-chip interface module 1310. Historically, a memory controller, which is described in more detail below, has been included in a computing system external to processor 1300. In this scenario, on-chip interface 1310 is to communicate with devices external to processor 1300, such as system memory 1375, a chipset (often including a memory controller hub to connect to memory 1375 and an I/O controller hub to connect peripheral devices), a memory controller hub, a northbridge, or other integrated circuit. And in this scenario, bus 1305 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1375 may be dedicated to processor 1300 or shared with other devices in a system. Common examples of types of memory 1375 include DRAM, SRAM, non-volatile memory (NV memory), and other known storage devices. Note that device 1380 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1300. For example in one embodiment, a memory controller hub is on the same package and/or die with processor 1300. Here, a portion of the core (an on-core portion) 1310 includes one or more controller(s) for interfacing with other devices such as memory 1375 or a graphics device 1380. The configuration including an interconnect and controllers for interfacing with such devices is often referred to as an on-core (or un-core configuration). As an example, on-chip interface 1310 includes a ring interconnect for on-chip communication and a high-speed serial point-to-point link 1305 for off-chip communication. Yet, in the SOC environment, even more devices, such as the network interface, co-processors, memory 1375, graphics processor 1380, and any other known computer devices/interface may be integrated on a single die or integrated circuit to provide small form factor with high functionality and low power consumption.

In one embodiment, processor 1300 is capable of executing a compiler, optimization, and/or translator code 1377 to compile, translate, and/or optimize application code 1376 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 14:
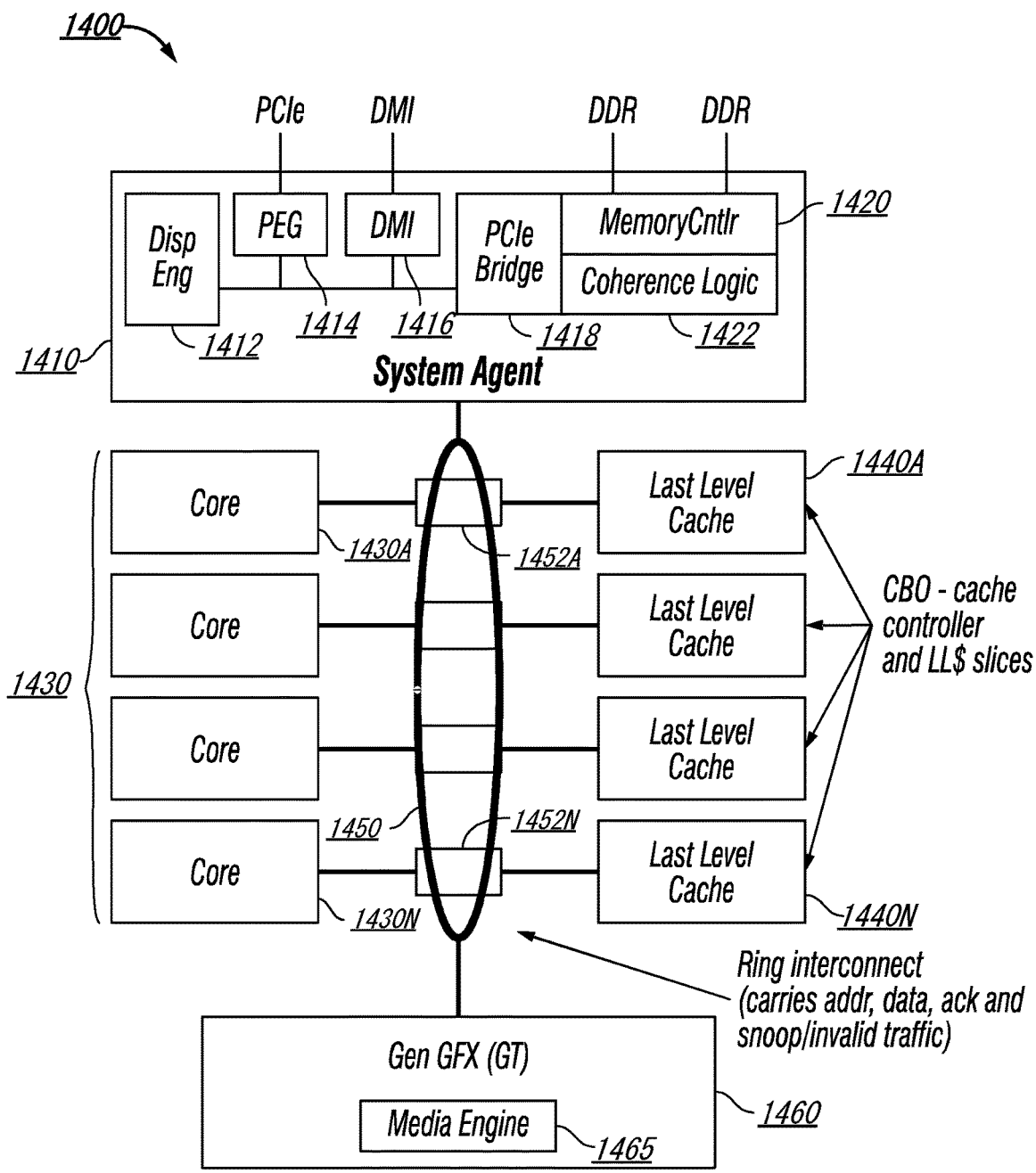
FIG. 14 illustrates another embodiment of a block diagram for a computing system including a multicore processor.

Referring now to FIG. 14, shown is a block diagram of an embodiment of a multicore processor. As shown in the embodiment of FIG. 14, processor 1400 includes multiple domains. Specifically, a core domain 1430 includes a plurality of cores 1430A-1430N, a graphics domain 1460 includes one or more graphics engines having a media engine 1465, and a system agent domain 1410.

In various embodiments, system agent domain 1410 handles power control events and power management, such that individual units of domains 1430 and 1460 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1430 and 1460 may operate at different voltage and/or power, and furthermore the individual units within the domains each potentially operate at an independent frequency and voltage. Note that while only shown with three domains, understand the scope of the present invention is not limited in this regard and additional domains may be present in other embodiments.

As shown, each core 1430 further includes low level caches in addition to various execution units and additional processing elements. Here, the various cores are coupled to each other and to a shared cache memory that is formed of a plurality of units or slices of a last level cache (LLC) 1440A-1440N; these LLCs often include storage and cache controller functionality and are shared amongst the cores, as well as potentially among the graphics engine too.

As seen, a ring interconnect 1450 couples the cores together, and provides interconnection between the core domain 1430, graphics domain 1460 and system agent circuitry 1410, via a plurality of ring stops 1452A-1452N, each at a coupling between a core and LLC slice. As seen in FIG. 14, interconnect 1450 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect. On-chip System Fabric (OSF), an Advanced Microcontroller Bus Architecture (AMBA) interconnect, a multi-dimensional mesh fabric, or other known interconnect architecture) may be utilized in a similar fashion.

As further depicted, system agent domain 1410 includes display engine 1412 which is to provide control of and an interface to an associated display. System agent domain 1410 may include other units, such as: an integrated memory controller 1420 that provides for an interface to a system memory (e.g., a DRAM implemented with multiple DIMMs; coherence logic 1422 to perform memory coherence operations. Multiple interfaces may be present to enable interconnection between the processor and other circuitry. For example, in one embodiment at least one direct media interface (DMI) 1416 interface is provided as well as one or more PCIe™ interfaces 1414. The display engine and these interfaces typically couple to memory via a PCIe™ bridge 1418. Still further, to provide for communications between other agents, such as additional processors or other circuitry, one or more other interfaces may be provided.

Figure 15:
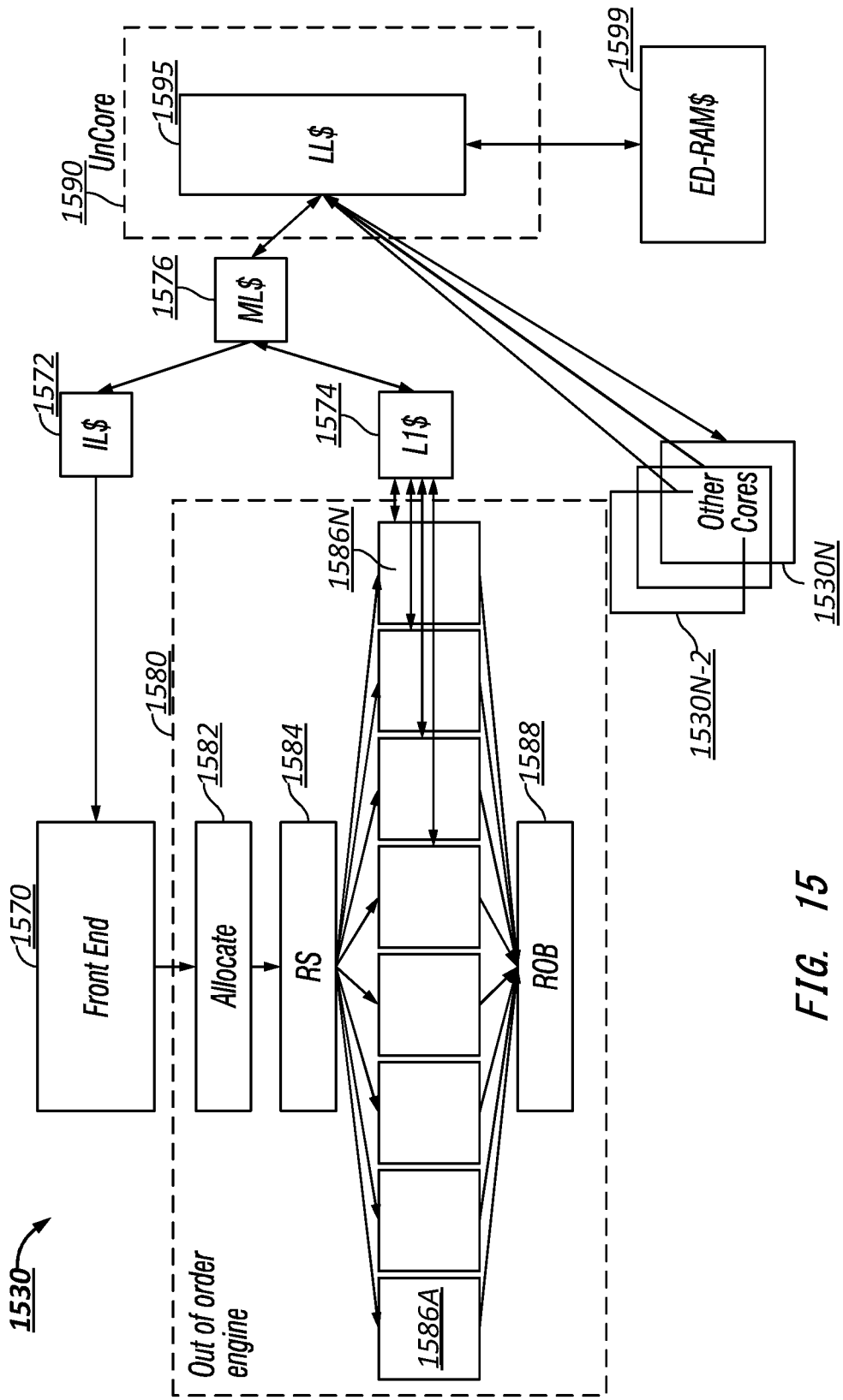
FIG. 15 illustrates an embodiment of a block diagram for a processor.

Referring now to FIG. 15, shown is a block diagram of a representative core; specifically, logical blocks of a back-end of a core, such as core 1430 from FIG. 14. In general, the structure shown in FIG. 15 includes an out-of-order processor that has a front end unit 1570 used to fetch incoming instructions, perform various processing (e.g. caching, decoding, branch predicting, etc.) and passing instructions/operations along to an out-of-order (OOO) engine 1580. OOO engine 1580 performs further processing on decoded instructions.

Specifically in the embodiment of FIG. 15, out-of-order engine 1580 includes an allocate unit 1582 to receive decoded instructions, which may be in the form of one or more micro-instructions or uops, from front end unit 1570, and allocate them to appropriate resources such as registers and so forth. Next, the instructions are provided to a reservation station 1584, which reserves resources and schedules them for execution on one of a plurality of execution units 1586A-1586N. Various types of execution units may be present, including, for example, arithmetic logic units (ALUs), load and store units, vector processing units (VPUs), floating point execution units, among others. Results from these different execution units are provided to a reorder buffer (ROB) 1588, which take unordered results and return them to correct program order.

Still referring to FIG. 15, note that both front end unit 1570 and out-of-order engine 1580 are coupled to different levels of a memory hierarchy. Specifically shown is an instruction level cache 1572, that in turn couples to a mid-level cache 1576, that in turn couples to a last level cache 1595. In one embodiment, last level cache 1595 is implemented in an on-chip (sometimes referred to as uncore) unit 1590. As an example, unit 1590 is similar to system agent 1410 of FIG. 14. As discussed above, uncore 1590 communicates with system memory 1599, which, in the illustrated embodiment, is implemented via ED RAM. Note also that the various execution units 1586 within out-of-order engine 1580 are in communication with a first level cache 1574 that also is in communication with mid-level cache 1576. Note also that additional cores 1530N-2-1530N can couple to LLC 1595. Although shown at this high level in the embodiment of FIG. 15, understand that various alterations and additional components may be present.

Figure 16:
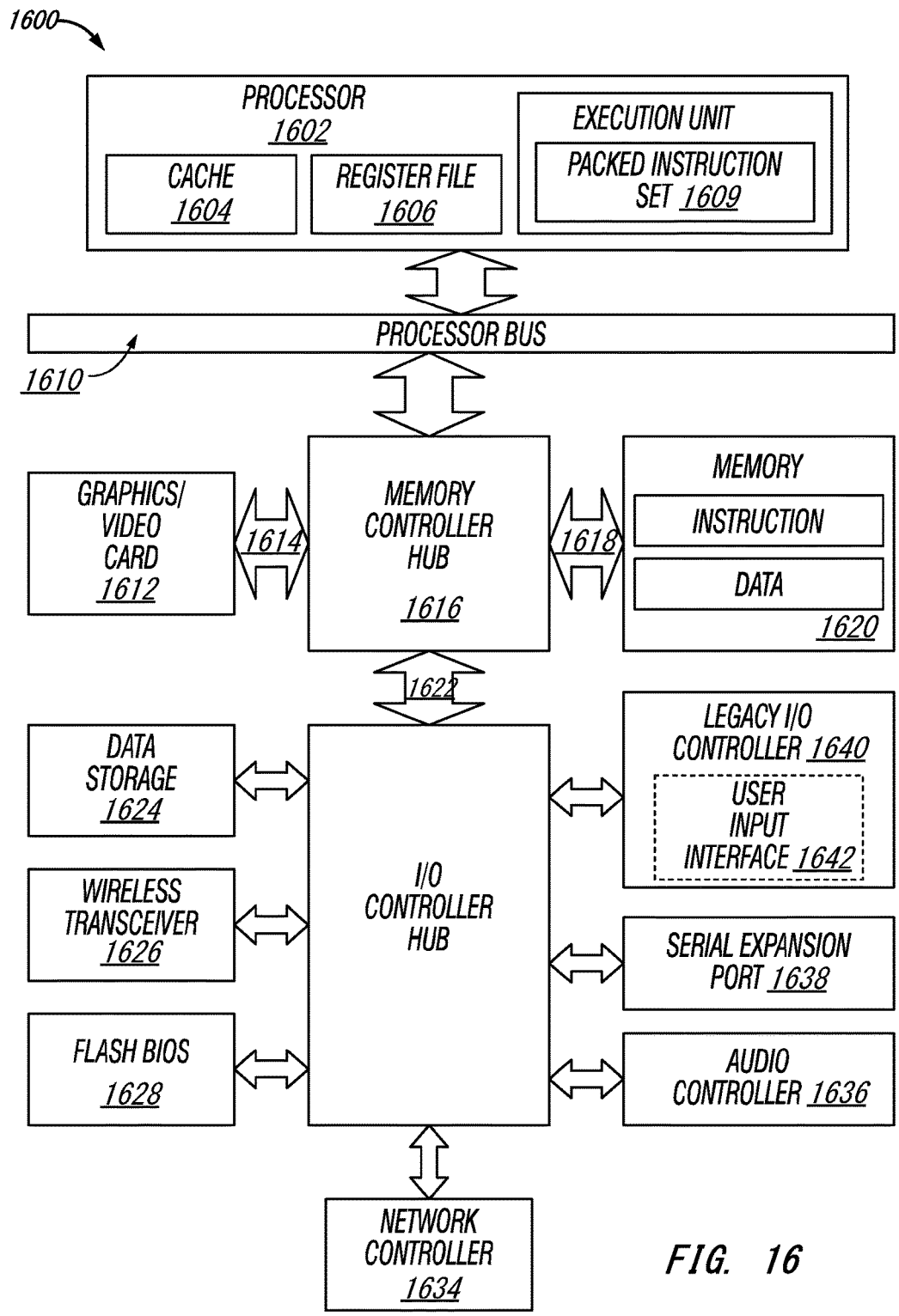
FIG. 16 illustrates another embodiment of a block diagram for a computing system including a processor.

Turning to FIG. 16, a block diagram of an exemplary computer system formed with a processor that includes execution units to execute an instruction, where one or more of the interconnects implement one or more features in accordance with one embodiment of the present invention is illustrated. System 1600 includes a component, such as a processor 1602 to employ execution units including logic to perform algorithms for process data, in accordance with the present invention, such as in the embodiment described herein. System 1600 is representative of processing systems based on the PENTIUM III™, PENTIUM 4™, Xeon™, Itanium, XScale™ and/or StrongARM™ microprocessors, although other systems (including PCs having other microprocessors, engineering workstations, set-top boxes and the like) may also be used. In one embodiment, sample system 1600 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1602 includes one or more execution units 1608 to implement an algorithm that is to perform at least one instruction. One embodiment may be described in the context of a single processor desktop or server system, but alternative embodiments may be included in a multiprocessor system. System 1600 is an example of a 'hub' system architecture. The computer system 1600 includes a processor 1602 to process data signals. The processor 1602, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1602 is coupled to a processor bus 1610 that transmits data signals between the processor 1602 and other components in the system 1600. The elements of system 1600 (e.g. graphics accelerator 1612, memory controller hub 1616, memory 1620, I/O controller hub 1624, wireless transceiver 1626, Flash BIOS 1628, Network controller 1634, Audio controller 1636, Serial expansion port 1638, I/O controller 1640, etc.) perform their conventional functions that are well known to those familiar with the art.

In one embodiment, the processor 1602 includes a Level 1 (L1) internal cache memory 1604. Depending on the architecture, the processor 1602 may have a single internal cache or multiple levels of internal caches. Other embodiments include a combination of both internal and external caches depending on the particular implementation and needs. Register file 1606 is to store different types of data in various registers including integer registers, floating point registers, vector registers, banked registers, shadow registers, checkpoint registers, status registers, and instruction pointer register.

Execution unit 1608, including logic to perform integer and floating point operations, also resides in the processor 1602. The processor 1602, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1602. For one embodiment, execution unit 1608 includes logic to handle a packed instruction set 1609. By including the packed instruction set 1609 in the instruction set of a general-purpose processor 1602, along with associated circuitry to execute the instructions, the operations used by many multimedia applications may be performed using packed data in a general-purpose processor 1602. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1608 may also be used in micro controllers, embedded processors, graphics devices, DSPs, and other types of logic circuits. System 1600 includes a memory 1620. Memory 1620 includes a dynamic random access memory (DRAM)

device, a static random access memory (SRAM) device, flash memory device, or other memory device. Memory 1620 stores instructions and/or data represented by data signals that are to be executed by the processor 1602.

Note that any of the aforementioned features or aspects of the invention may be utilized on one or more interconnect illustrated in FIG. 16. For example, an on-die interconnect (ODI), which is not shown, for coupling internal units of processor 1602 implements one or more aspects of the invention described above. Or the invention is associated with a processor bus 1610 (e.g. other known high performance computing interconnect), a high bandwidth memory path 1618 to memory 1620, a point-to-point link to graphics accelerator 1612 (e.g. a Peripheral Component Interconnect express (PCIe) compliant fabric), a controller hub interconnect 1622, an I/O or other interconnect (e.g. USB, PCI, PCIe) for coupling the other illustrated components. Some examples of such components include the audio controller 1636, firmware hub (flash BIOS) 1628, wireless transceiver 1626, data storage 1624, legacy I/O controller 1610 containing user input and keyboard interfaces 1642, a serial expansion port 1638 such as Universal Serial Bus (USB), and a network controller 1634. The data storage device 1624 can comprise a hard disk drive, a floppy disk drive, a CD-ROM device, a flash memory device, or other mass storage device.

Figure 17:
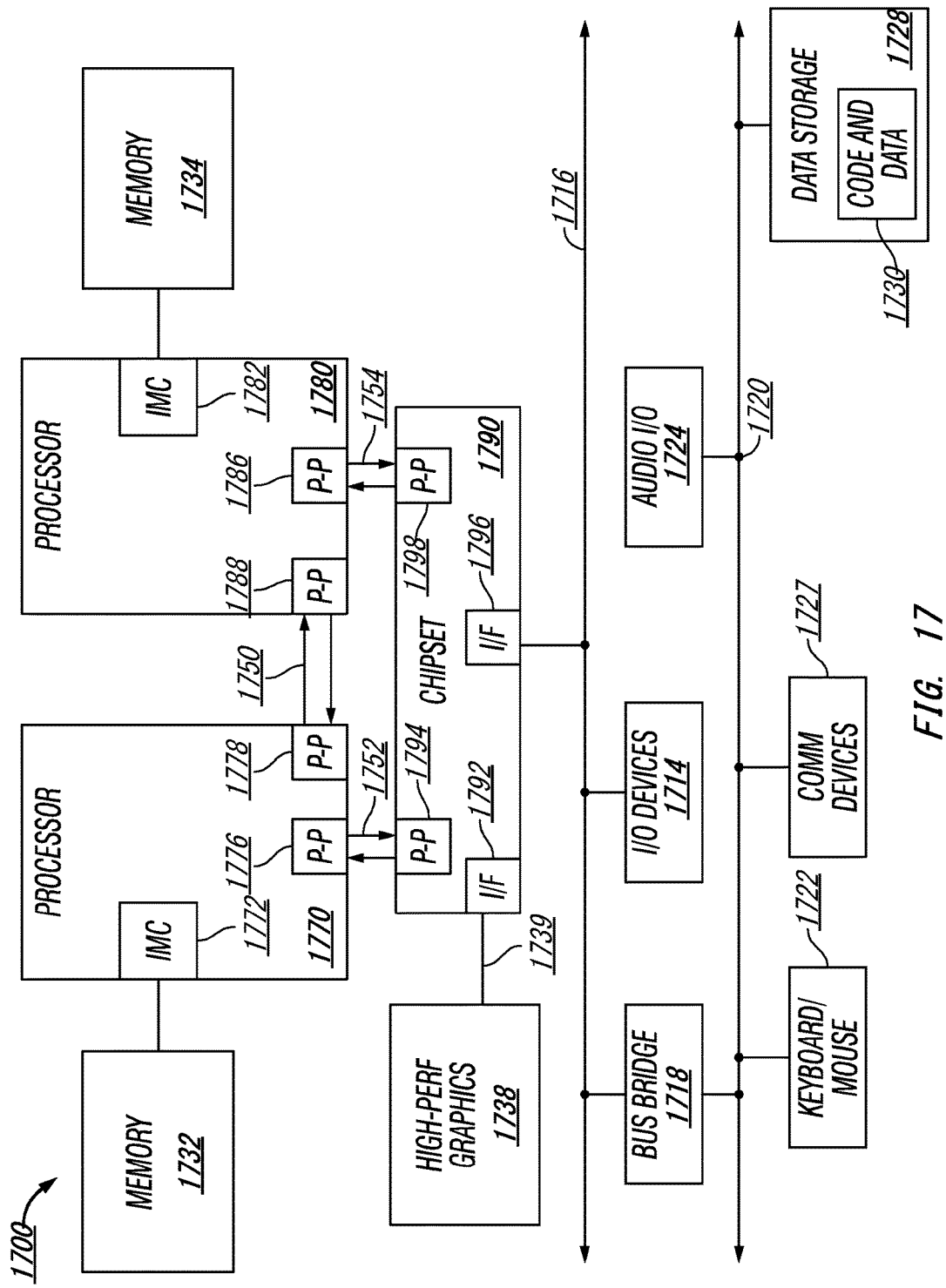
FIG. 17 illustrates an embodiment of a block for a computing system including multiple processor sockets.

Referring now to FIG. 17, shown is a block diagram of a second system 1700 in accordance with an embodiment of the present invention. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of a processor. In one embodiment, 1752 and 1754 are part of a serial, point-to-point coherent interconnect fabric, such as a high-performance architecture. As a result, the invention may be implemented within the QPI architecture.

While shown with only two processors 1770, 1780, it is to be understood that the scope of the present invention is not so limited. In other embodiments, one or more additional processors may be present in a given processor.

Processors 1770 and 1780 are shown including integrated memory controller units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 each exchange information with a chipset 1790 via individual P-P interfaces 1752, 1754 using point to point interface circuits 1776, 1794, 1786, 1798. Chipset 1790 also exchanges information with a high-performance graphics circuit 1738 via an interface circuit 1792 along a high-performance graphics interconnect 1739.

A shared cache (not shown) may be included in either processor or outside of both processors; yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present invention is not so limited.

As shown in FIG. 17, various I/O devices 1716 are coupled to first bus 1716, along with a bus bridge 1718 which couples first bus 1716 to a second bus 1720. In one embodiment, second bus 1720 includes a low pin count (LPC) bus. Various devices are coupled to second bus 1720 including, for example, a keyboard and/or mouse 1722, communication devices 1727 and a storage unit 1728 such as a disk drive or other mass storage device which often includes instructions/code and data 1730, in one embodiment. Further, an audio I/O 1724 is shown coupled to second bus 1720. Note that other architectures are possible, where the included components and interconnect architectures vary. For example, instead of the point-to-point architecture of FIG. 17, a system may implement a multi-drop bus or other such architecture.

Figure 18:
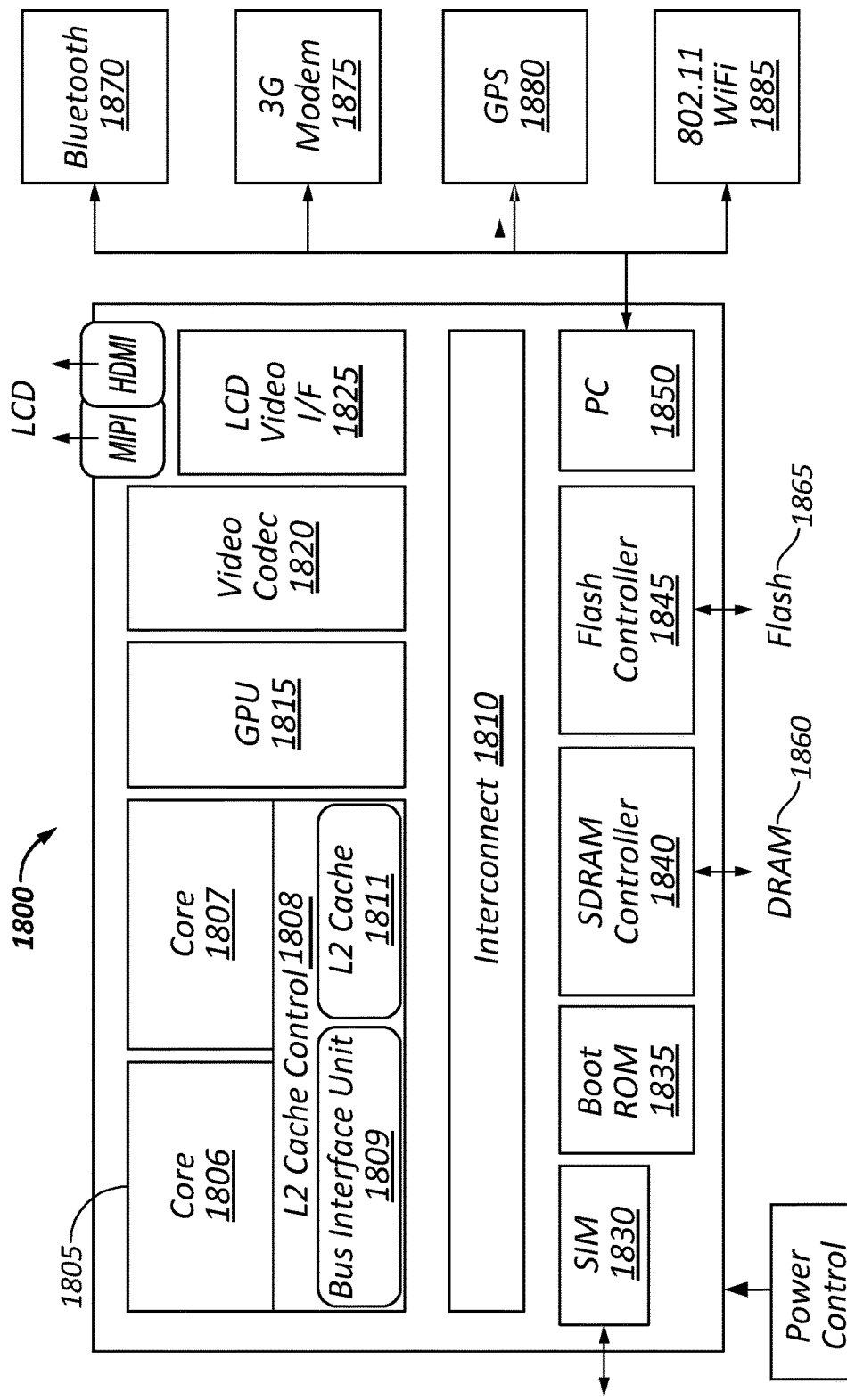
FIG. 18 illustrates another embodiment of a block diagram for a computing system.

Turning next to FIG. 18, an embodiment of a system on-chip (SOC) design in accordance with the inventions is depicted. As a specific illustrative example, SOC 1800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1800 includes 2 cores—1806 and 1807. Similar to the discussion above, cores 1806 and 1807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1806 and 1807 are coupled to cache control 1808 that is associated with bus interface unit 1809 and L2 cache 1811 to communicate with other parts of system 1800. Interconnect 1810 includes an on-chip interconnect, such as an IOSF, AMBA, or other interconnect discussed above, which potentially implements one or more aspects of described herein.

Interconnect 1810 provides communication channels to the other components, such as a Subscriber Identity Module (SIM) 1830 to interface with a SIM card, a boot rom 1835 to hold boot code for execution by cores 1806 and 1807 to initialize and boot SOC 1800, a SDRAM controller 1840 to interface with external memory (e.g. DRAM 1860), a flash controller 1845 to interface with non-volatile memory (e.g. Flash 1865), a peripheral control 1850 (e.g. Serial Peripheral Interface) to interface with peripherals, video codecs 1820 and Video interface 1825 to display and receive input (e.g. touch enabled input), GPU 1815 to perform graphics related computations, etc. Any of these interfaces may incorporate aspects of the invention described herein.

In addition, the system illustrates peripherals for communication, such as a Bluetooth module 1870, 3G modem 1875, GPS 1885, and WiFi 1885. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, and a method to embed a periodic control window in a link layer data stream to be sent over a serial data link, wherein the control window is configured to provide physical layer information including information for use in initiating state transitions on the data link.

In at least one example, the data stream comprises a series of flits.

In at least one example, the link layer data stream is sent during a link transmitting state of the data link.

One or more examples can further provide identifying a particular control window in the data stream and send reset data to a device connected to the data link during the particular control window, wherein the reset data is to communicate an attempt to enter a reset state from the link transmitting state.

One or more examples can further provide generating a supersequence associated with the reset state and send the supersequence to the device.

One or more examples can further provide identifying a particular control window in the data stream and send link width transition data to a device connected to the data link during the particular control window, wherein the link width transition data is to communicate an attempt to change the number of active lanes on the link.

In at least one example, the number of lanes are to be reduced from an original number to a new number, wherein reducing the number of active lanes is associated with entry into a partial width link transmitting state.

One or more examples can further provide identifying a subsequent control window in the data stream and send partial width state exit data to the device during the subsequent control window, wherein the partial width state exit data is to communicate an attempt to return the number of active lanes to the original number.

One or more examples can further provide identifying a particular control window in the data stream and send low power data to a device connected to the data link during the particular control window, wherein the low power data is to communicate an attempt to enter a low power state from the link transmitting state.

In at least one example, control windows are embedded according to a defined control interval and devices connected to the data link are to synchronize the state transition with an end of a corresponding control interval.

One or more embodiments may provide an apparatus, a system, a machine readable storage, a machine readable medium, and a method to receive a data stream wherein the data stream is to include alternating transmitting intervals and control intervals, wherein link layer flits are to be sent during the transmitting intervals and the control intervals are to provide opportunities to send physical layer control information, identify control data to be included in a particular one of the control intervals, the control data to indicate an attempted entry into a particular state from a first state, wherein the data stream is to be received in the first state, and facilitate transition into the particular state.

In at least one example, the particular state comprises a reset state.

In at least one example, facilitating transition into the particular state includes sending an acknowledgement of the attempted entry into the particular state.

In at least one example, the acknowledgement is sent within the control interval.

In at least one example, the data stream is sent over a serial data link including a plurality of active lanes and the particular state comprises a partial width state, wherein at least a subset of lanes included in the plurality of active lanes are to become idle in the partial width state.

One or more examples can further provide identifying subsequent data included in a subsequent one of the control intervals, the subsequent data indicating an attempt to exit the partial width state and reactivate the idle lanes.

In at least one example, the particular state comprises a low power transmitting state.

In at least one example, the data stream is received over a serial data link including a plurality of active lanes and the particular state comprises a partial width state, wherein at least a subset of lanes included in the plurality of active lanes are to become idle in the partial width state.

In at least one example, the particular state comprises a reset state.

In at least one example, the physical layer control information describes an error of the data link.

One or more embodiments may provide an apparatus, a system, a machine readable storage, a machine readable medium, and a method to embed a clock signal in data to be communicated from a first device over a serial data link including a plurality of lanes, and transition from a first link transmitting state that is to use a first number of the plurality of lanes to a second link transmitting state that is to use a second number of the plurality of lanes.

In at least one example, the second number of lanes is greater than the first number of lanes.

In at least one example, transitioning from the first link transmitting state to the second link transmitting state includes sending a partial width state exit supersequence comprising one or more instances of a sequence including an electrical ordered set (EOS) and a plurality of instances of a training sequence.

In at least one example, transitioning from the first link transmitting state to the second link transmitting state further includes sending an initial EOS preceding the partial width state exit supersequence.

In at least one example, null flits are to be sent on active lanes during the sending of the initial EOS.

In at least one example, the training sequence comprises an unscrambled fast training sequence (FTS).

In at least one example, transitioning from the first link transmitting state to the second link transmitting state further includes using the partial width state exit supersequence to initialize at least a portion of idle lanes included in the plurality of lanes.

In at least one example, transitioning from the first link transmitting state to the second link transmitting state further includes sending a start of data sequence (SDS) following initialization of the portion of the idle lanes.

In at least one example, transitioning from the first link transmitting state to the second link transmitting state further includes sending a partial FTS (FTSp) following the sending of the SDS.

In at least one example, transitioning from the first link transmitting state to the second link transmitting state further includes receiving an acknowledgement of the transition, wherein the acknowledgement includes the partial width state exit supersequence.

In at least one example, transitioning from the first link transmitting state to the second link transmitting state includes sending an in-band signal over the data link to the second device.

In at least one example, the first number of lanes is greater than the second number of lanes.

In at least one example, the data comprises a datastream including alternating transmitting intervals and control intervals, and the signal is sent within a particular control interval and indicates the transition from the first link transmitting state to the second link transmitting state.

In at least one example, the transition from the first link transmitting state to the second link transmitting state is to be synchronized with end of a particular transmitting interval immediately following the particular control interval.

In at least one example, the transition is based on a request of a power control unit.

One or more embodiments may provide an apparatus, a system, a machine readable storage, a machine readable medium, and a method to receive a data stream wherein the data stream is to include alternating transmitting intervals and control intervals, wherein the control intervals are to provide opportunities to send physical layer control information, and the data stream is to be sent over a serial data link that is to include active lanes and inactive lanes, identify control data included in a particular one of the control intervals, wherein the data is to indicate an attempt to activate at least a portion of the inactive lanes of the link, and facilitate activation of the portion of the inactive lanes.

In at least one example, the data stream is received while the data link is in a partial width state and the control data is to indicate an attempt to exit the partial width state.

In at least one example, facilitating activation of the portion of the inactive lanes is to include receiving a supersequence that is to indicate the attempt to activate the portion of the inactive lanes.

In at least one example, the supersequence is to comprise one or more instances of a sequence including an electric idle exit ordered set (EIEOS) and a plurality of instances of a training sequence.

In at least one example, facilitating activation of the portion of the inactive lanes includes sending at least one initial EIEOS to immediately precede the supersequence.

In at least one example, null flits are to be sent on the active lanes during the sending of the initial EIEOS.

In at least one example, the training sequence comprises an unscrambled fast training sequence (FTS).

In at least one example, facilitating activation of the portion of the inactive lanes further includes using the supersequence to initialize the portion of the inactive lanes.

In at least one example, facilitating activation of the portion of the inactive lanes further includes receiving a start of data sequence (SDS) following initialization of the portion of the inactive lanes.

In at least one example, facilitating activation of the portion of the inactive lanes further includes receiving a partial FTS (FTSp) following the SDS.

In at least one example, facilitating activation of the portion of the inactive lanes further includes acknowledging the attempt by echoing the supersequence.

One or more embodiments may provide an apparatus, a system, a machine readable storage, a machine readable medium, and a method to receive a data stream wherein the data stream is to include alternating transmitting intervals and control intervals, wherein link layer flits are to be sent during the transmitting intervals and the control intervals are to provide opportunities to send physical layer control information, identify control data that indicates an attempted entry into a low power state from a link transmitting state, wherein the data stream is to be received in the link transmitting state, and transition into the low power state.

In at least one example, the control data comprises a predefined code.

In at least one example, transitioning into the low power state includes echoing the predefined code in a subsequent control interval.

In at least one example, transitioning into the low power state includes receiving a supersequence indicating the transition to the low power state.

In at least one example, transitioning into the low power state further includes echoing the supersequence.

In at least one example, the supersequence comprises one or more instances of a sequence including an electrical ordered set (EOS) followed by a predetermined number of instances of a training sequence.

In at least one example, the EOS comprises an electrical idle electrical ordered set (EIEOS).

One or more embodiments may provide an apparatus, a system, a machine readable storage, a machine readable medium, and a method to identify a particular instance of a periodic control interval to be embedded in a data stream on a serial data link during a link transmitting state, send state transition data during the particular instance of the control interval to a device, wherein the state transition data is to indicate an attempt to enter a low power state, and transition into the low power state.

One or more examples can further provide receiving an acknowledgement from the device, the acknowledgement comprising the state transition data.

In at least one example, the acknowledgement is to coincide with a next periodic control interval.

In at least one example, transitioning into the low power state includes sending a supersequence to the device indicating the transition to the low power state.

In at least one example, transitioning into the low power state further includes receiving a repeated instance of the supersequence from the device.

In at least one example, the supersequence comprises one or more instances of a sequence including an electrical ordered set (EOS) followed by a predetermined number of instances of a training sequence.

In at least one example, the EOS comprises an electric idle exit ordered set (EIEOS).

In at least one example, transition into the low power state is based on a request of a power control unit.

One or more examples can further provide initiating a transition from the low power state to the link transmitting state.

One or more examples can further provide a physical layer (PHY) configured to be coupled to a serial, differential link, the PHY to periodically issue a blocking link state (BLS), the BLS request to cause an agent to enter a BLS to hold off link layer flit transmission for a duration, wherein the PHY is to utilize the serial, differential link during the duration for PHY associated tasks.

In at least one example, the PHY is to utilize the serial, differential link during the duration for PHY associated tasks comprises sending one or more messages of a priority message list including a no-op, reset, in-band reset, entry into low power state, entry into partial width state, entry into other PHY state, etc.

One or more examples can further provide a physical layer (PHY) configured to be coupled to a link, the link including a first number of lanes, wherein the PHY is to transmit flits over the first number of lanes in a full width transmitting link state, and wherein the PHY is to transmit flits over a second number of lanes, which is less than the first number of lanes, in a partial-width transmitting link state.

In at least one example, the PHY is to utilize a blocking link state to enter the partial-width transmitting link state from the blocking link state.

In at least one example, the flits have the same size when transmitting over the first number of lanes and the second number of lanes.

In at least one example, the PHY utilizes an embedded clock for transmitting over the first number of lanes and over the second number of lanes.

In at least one example, the PHY utilizes an embedded clock for transmitting over the first number of lanes and a forwarded clock for transmitting over the second number of lanes.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor device comprising:
a transmitter port comprising physical layer logic to:
send a request to enter a partial width state to a remote agent, wherein the request is sent over a link during a control link state comprising a timed state during which link layer flits are held off while physical layer information is to be communicated to the remote agent, the link comprises a plurality of lanes, a subset of the plurality of lanes of the link are to be used during the partial width state, and lanes in the plurality of lanes not included in the subset are to be idle lanes during the partial width state;
turn off the idle lanes in a staggered manner; and
send a link layer flit over the subset of lanes during the partial width state; and
wherein the transmitter further comprises link layer logic to generate the link layer flit.

2. The processor device of claim 1, wherein the transmitter port is to transmit on each of the plurality of lanes.

3. The processor device of claim 1, wherein the plurality of lanes comprises 20 lanes and the subset of lanes comprise 8 lanes.

4. The processor device of claim 1, further comprising a receiver port to receive data on the plurality of lanes of the link.

5. The processor device of claim 4, wherein the receiver port is to receive data on only the subset of lanes during the partial width state.

6. The processor device of claim 1, wherein the control link state is to periodically interrupt a link transmitting state.

7. The processor device of claim 1, wherein the request to enter the partial width state comprises a supersequence, and the supersequence comprises a repeating pattern.

8. The processor device of claim 7, wherein the repeating pattern comprises an electrical ordered set (EOS) and a plurality of training sequences.

9. The processor device of claim 8, wherein the EOS comprises an electrical idle exit ordered set (EIEOS).

10. The processor device of claim 8, wherein the plurality of training sequences comprises a predefined number of training sequences to be sent in series within the repeating pattern.

11. The processor device of claim 10, wherein the predefined number comprises six training sequences.

12. The processor device of claim 8, wherein the training sequences comprise fast training sequences.

13. A method comprising:
sending the link layer flits during a transmitting link state;
sending a request to enter a partial width state to a remote agent, wherein the request is sent over a link during a control link state comprising a timed state during which link layer flits are held off while physical layer information is to be communicated to the remote agent, the control link state is to be entered periodically to interrupt the transmitting link state, the link comprises a plurality of lanes, a subset of the plurality of lanes of the link are to be used during the partial width state, and lanes in the plurality of lanes not included in the subset are to be idle lanes during the partial width state;
turning off the idle lanes in a staggered manner; and
sending a link layer flit over the subset of lanes during the partial width state.

14. The method of claim 13, wherein all of the plurality of lanes are to be used to send the link layer flits during the transmitting link state.

15. An apparatus comprising:
a controller to interface between at least a first processor to recognize a first instruction set and second processor to recognize a second instruction set that is different from the first instruction set, the controller comprising protocol layer logic, link layer logic, and physical layer logic, wherein the physical layer logic is to:
send a request to enter a partial width state to another device, wherein the request is sent over a link during a periodic control window in which link layer flits are held off while physical layer control information is to be communicated to the first device, the link comprises a plurality of lanes, a subset of the plurality of lanes of the link are to be used during the partial width state, lanes in the plurality of lanes outside the subset are to be transitioned to an idle state during the partial width state, the request to enter the partial width state comprises a supersequence, and the supersequence comprises a repeating pattern;

transition the lanes outside the plurality of lanes to the idle state in a staggered manner; and send a link layer flit to the first device over the subset of lanes during the partial width state.

16. The apparatus of claim 15, wherein the repeating pattern comprises an electrical idle exit ordered set (EIEOS) and a plurality of training sequences.

17. The apparatus of claim 16, wherein the plurality of training sequences comprise a predefined number of fast training sequences to be sent in the repeating pattern.

18. A system comprising:
a first device;
a second device to connect to the first device via a link, wherein the second device comprises physical layer logic to:
    send a request to enter a partial width state to the first device, wherein the request is sent over the link during a control link state comprising a timed state during which link layer flits are held off while physical layer information is to be communicated to the first device, the link comprises a plurality of lanes, a subset of the plurality of lanes of the link are to be used during the partial width state, and lanes in the plurality of lanes outside the subset are to be transitioned to an idle state during the partial width state, wherein the request to enter the partial width state comprises a supersequence, and the supersequence comprises a repeating pattern;
    stagger transitions of the lanes outside the plurality of lanes to the idle state; and
    send a link layer flit to the first device over the subset of lanes during the partial width state.

19. The system of claim 18, wherein one or both of the first and second devices comprises a processor node.

20. The system of claim 18, wherein one or both of the first and second devices comprises an accelerator.

21. The system of claim 18, wherein one or both of the first and second devices comprises a node controller.

22. The system of claim 18, wherein the first device comprises physical layer logic to:
receive the request to enter a partial width state from the second device;
participate in staggering transitions of the lanes outside the plurality of lanes to the idle state; and
receive the link layer flit from the second device over the subset of lanes during the partial width state.

* * * * *